G. A. SAGER.
MACHINE FOR TURNING, BEADING, AND PRESSING CUFFS, COLLARS, AND THE LIKE.
APPLICATION FILED MAY 25, 1916.

1,299,039.

Patented Apr. 1, 1919.
10 SHEETS—SHEET 3.

Witness

Inventor
George A. Sager
By
Attorneys

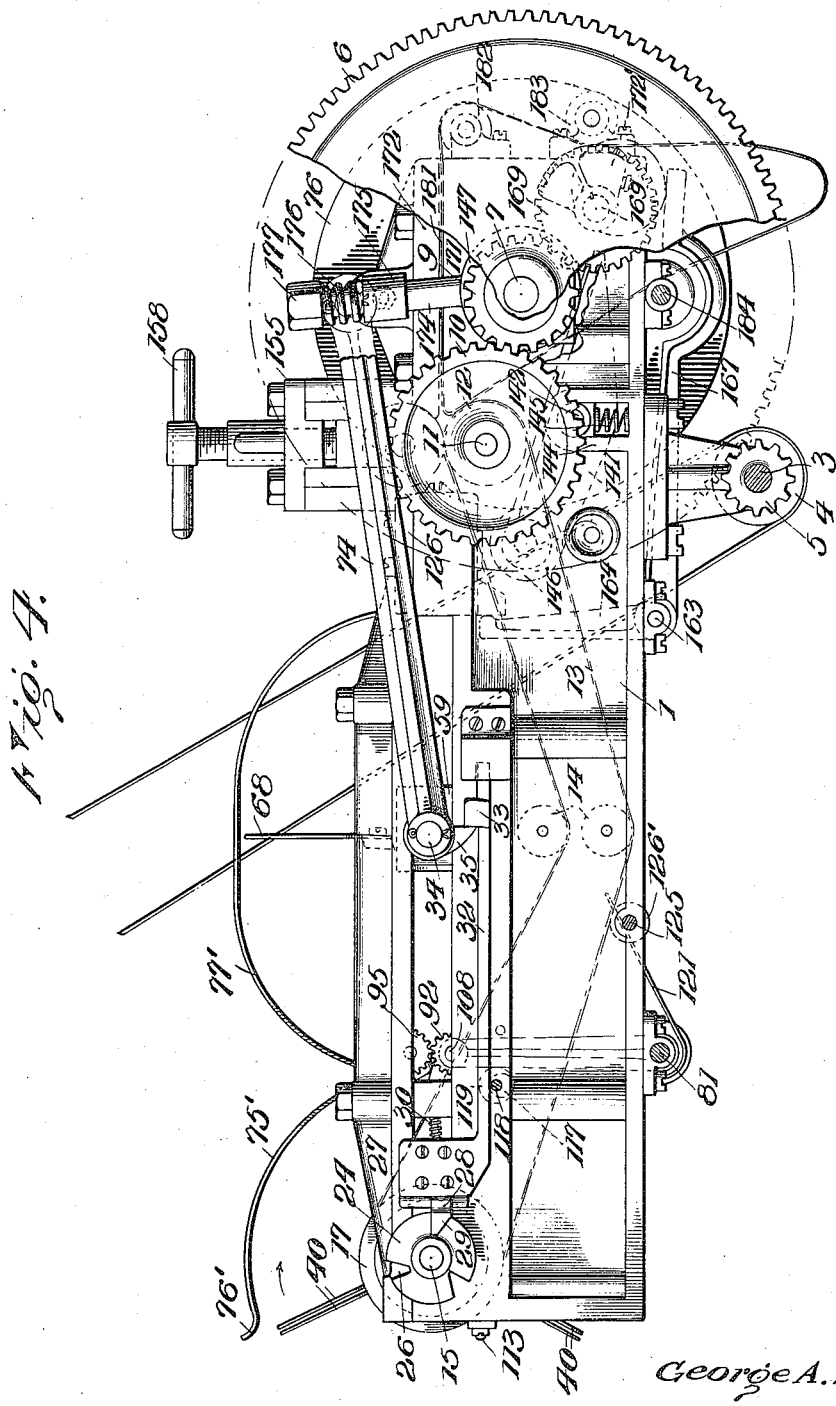

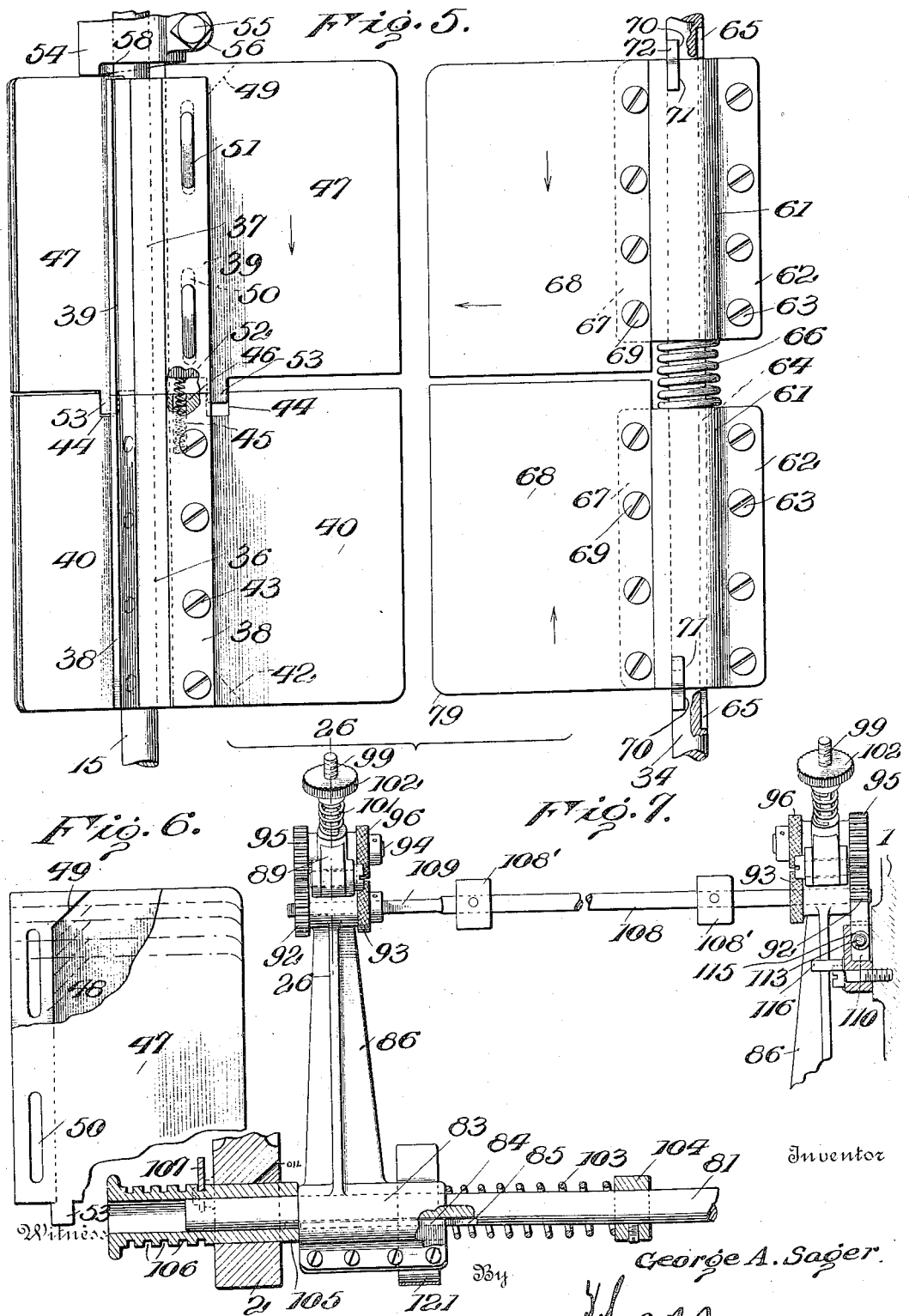

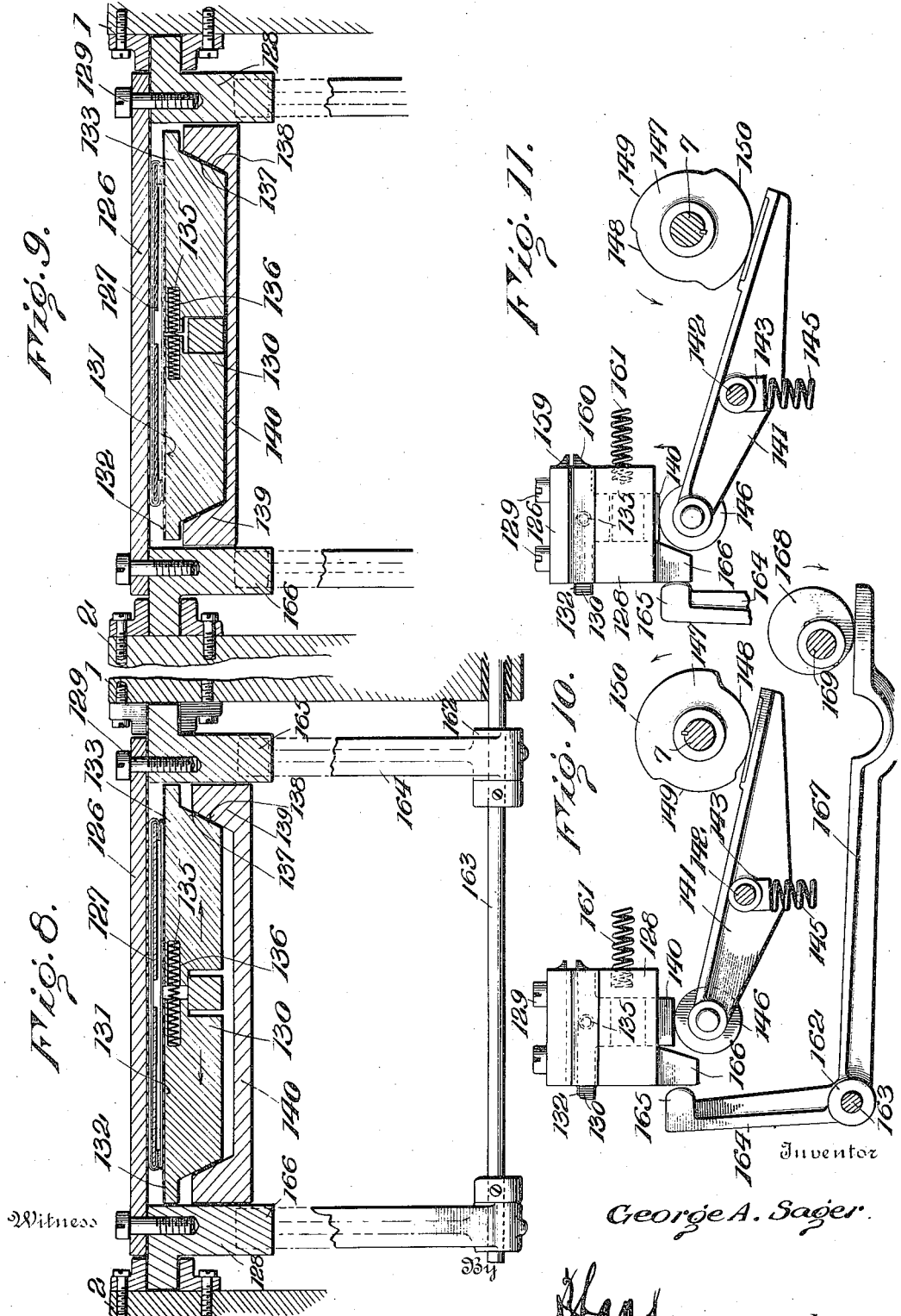

G. A. SAGER.
MACHINE FOR TURNING, BEADING, AND PRESSING CUFFS, COLLARS, AND THE LIKE.
APPLICATION FILED MAY 25, 1916.
1,299,039.
Patented Apr. 1, 1919.
10 SHEETS—SHEET 7.
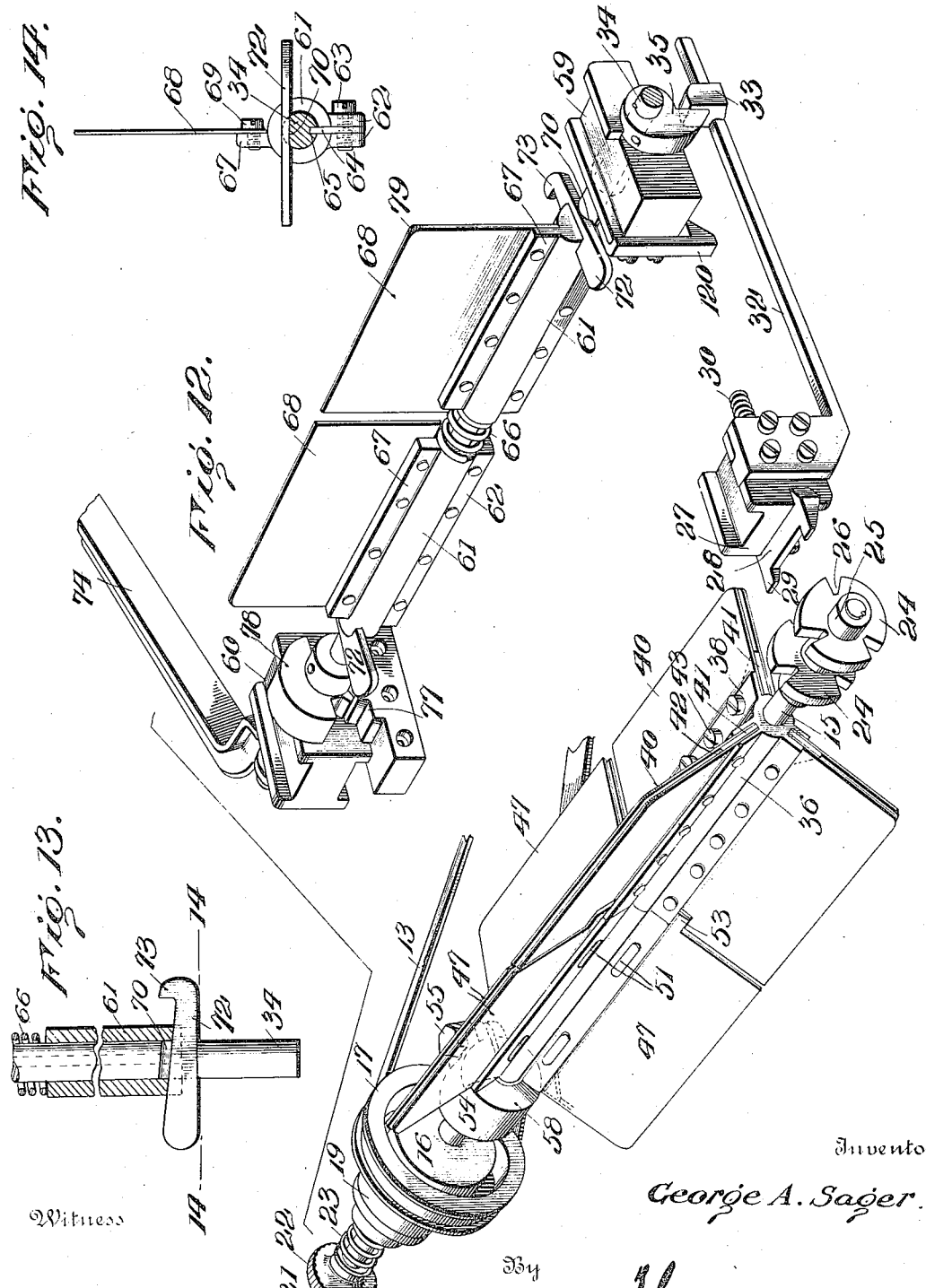
Inventor
George A. Sager.
By
[signature], Attorneys.

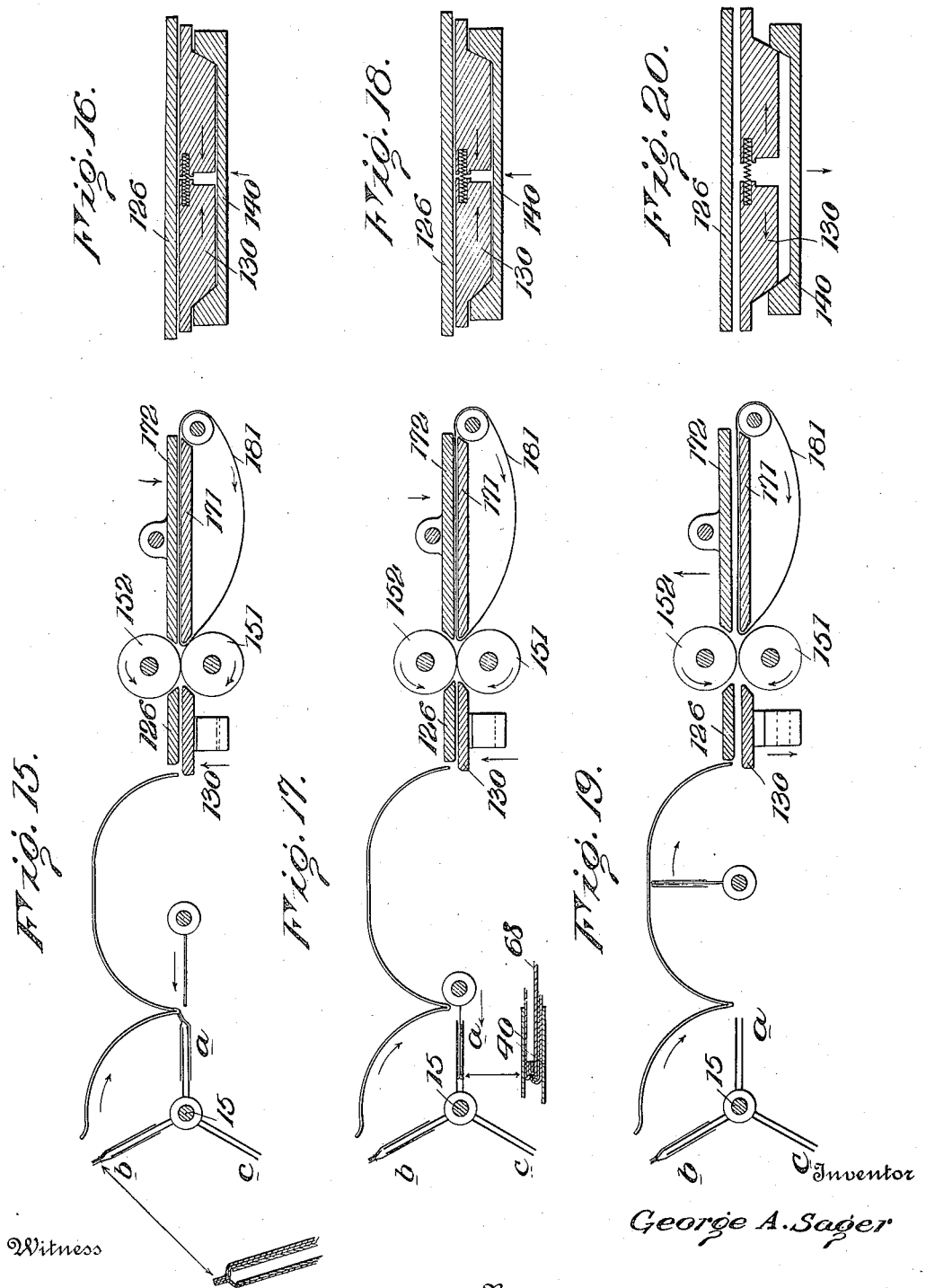

G. A. SAGER.
MACHINE FOR TURNING, BEADING, AND PRESSING CUFFS, COLLARS, AND THE LIKE.
APPLICATION FILED MAY 25, 1916.
1,299,039.
Patented Apr. 1, 1919.
10 SHEETS—SHEET 9.
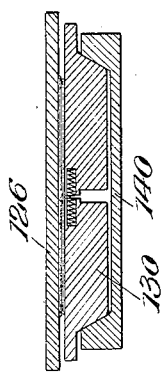
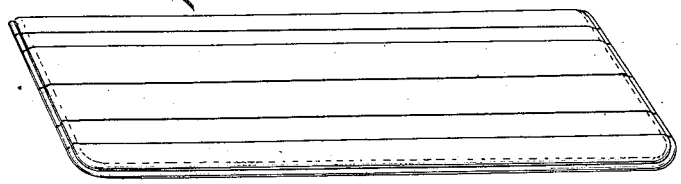
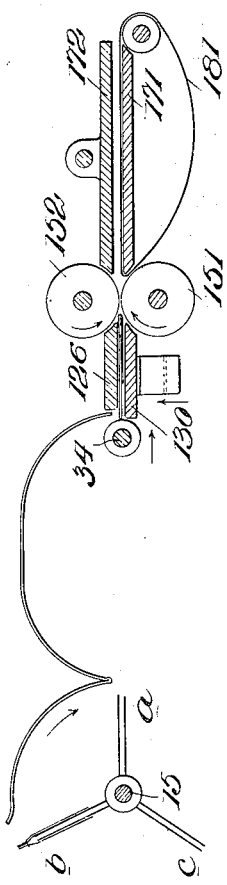
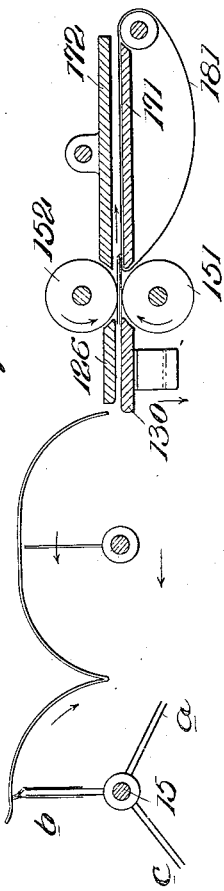
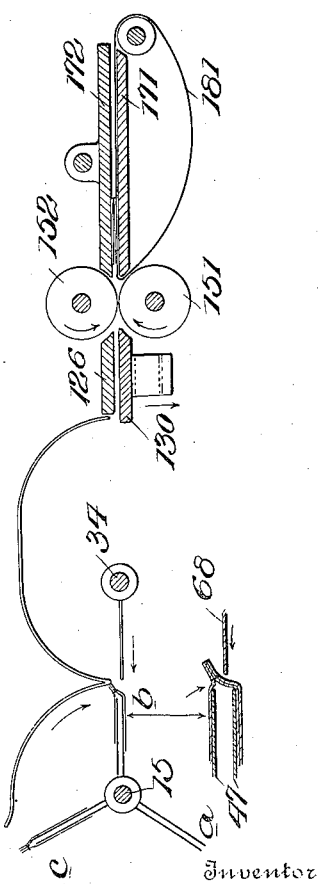
Inventor
George A. Sager.
By
Attorneys.

G. A. SAGER.
MACHINE FOR TURNING, BEADING, AND PRESSING CUFFS, COLLARS, AND THE LIKE.
APPLICATION FILED MAY 25, 1916.
1,299,039.
Patented Apr. 1, 1919.
10 SHEETS—SHEET 10.
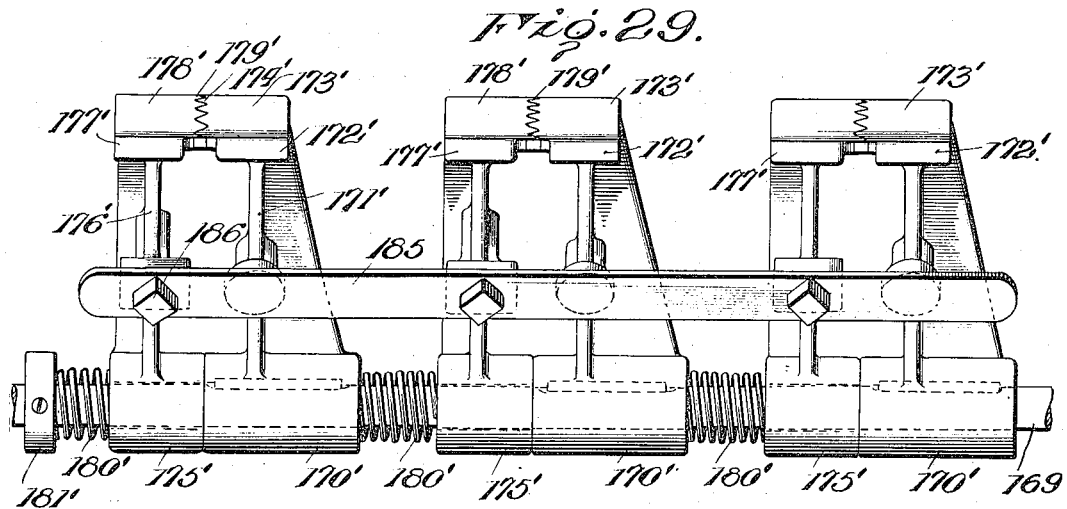
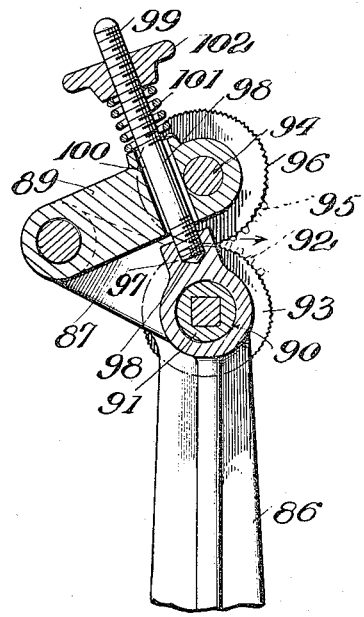
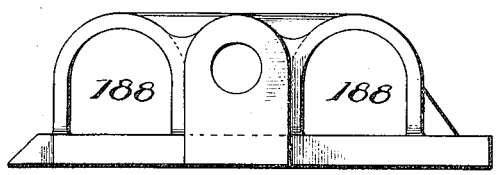
Inventor
George A. Sager
By
Attorneys

UNITED STATES PATENT OFFICE.

GEORGE A. SAGER, OF ALBANY, NEW YORK.

MACHINE FOR TURNING, BEADING, AND PRESSING CUFFS, COLLARS, AND THE LIKE.

1,299,039.  Specification of Letters Patent.  Patented Apr. 1, 1919.

Application filed May 25, 1916. Serial No. 99,867.

*To all whom it may concern:*

Be it known that I, GEORGE A. SAGER, a citizen of the United States, residing at Albany, in the county of Albany and State of New York, have invented certain new and useful Improvements in Machines for Turning, Beading, and Pressing Cuffs, Collars, and the like, of which the following is a specification.

This invention relates to a machine for turning, beading, and pressing cuffs, collars, and similar work in the manufacture of garments of which these members form a part.

In the manufacture of a shirt cuff two facing plies are placed face to face and one or more backing plies are then disposed against the obverse face of one of the facing plies and all of the plies are united by a line of stitching extending along their lateral edges and along one longitudinal edge. At the present time the work thus prepared is turned by hand so that the facing plies will be outermost and the work is then pressed, a bead being formed at the same time, projecting approximately one-sixteenth of an inch beyond the line of stitching which unites the several plies, the purpose of this bead being to prolong the life of the front and lateral edges of the cuff. These several operations have heretofore been performed by hand and hence considerable time is required to properly complete a cuff of this nature. The bead must be formed with care and the work must be carefully pressed so as to insure against disturbance or breaking down of the bead while the cuff is being finally stitched; that is to say while the usual line of stitching is run through the plies approximately three-sixteenths of an inch in from the lateral and forward edges of the cuff. In consideration of the time and care required to form a cuff of this nature solely by hand, the present invention aims to provide a machine which will automatically perform the several steps incident to the production of such a cuff, thereby permitting of the cuffs being manufactured in large numbers at a much lower cost than is possible when the work is done solely manually and also providing for the production of a more perfectly formed article.

One object of the invention is to provide a novel and efficient means for automatically turning the work which means will also automatically properly position the edge portions of the plies beyond the initial line of stitching to provide for proper formation of the beading at the front and lateral edges of the work.

Another aim of the invention is to so construct the turning mechanism of the machine that the same will not only turn the work without likelihood of injury to the work, but will on the other hand automatically adapt itself to slight variations in the size of the work due to deviations in the lines of stitching and will hold the work properly stretched or distended to insure of perfect turning.

Another aim of the invention is to provide means for acting upon the work after it has been turned, for the purpose of accurately forming the bead at the forward and lateral edges of the work and for initially pressing the work so as to insure against disturbance or breaking down of the said bead.

Another aim of the invention is to provide a final press for acting upon the work after it has left the beading press above referred to, which final press will be so constructed and so operated as to repeatedly press the work as the same is fed therethrough.

The invention also aims to provide novel means for deflecting the forward edge portion of the cuff or other work lying beyond the line of initial stitching, immediately prior to the turning operation so as to insure of proper positioning of the said forward edge portions of the several plies for the formation of the bead at the forward edge of the work during the turning operation and likewise the proper formation of the bead in the further treatment of the work.

Another aim of the invention is to so construct the turning mechanism of the machine that the machine may be readily and quickly adapted for operation upon cuffs or other work of different sizes.

In the operation of a machine embodying the present invention the only manual labor to be performed is that of placing the unturned cuffs or other work upon the feeder plates which constitute elements of the turning mechanism, these plates being successively brought to position where the work may be conveniently placed thereon by the operator of the machine, and while the machine as a whole is constructed and arranged to rapidly turn, bead, and press the work, the invention aims to provide means whereby the feeder plates may be held stationary for a maximum period of time so as to allow the operator full opportunity to properly place the unturned work upon the said plates.

Another aim of the invention is to so construct the beading press and the final press of the machine that these presses will accurately perform their functions and yet compensate for irregularities in the thickness of the work passing therethrough.

The turning mechanism of the machine embodying the present invention includes feeder plates which are, as before stated, successively brought into position where the unturned work may be conveniently fitted thereon by the operator of the machine and each of these plates is formed in sections and means is provided yieldably tending to hold the sections separated so as to longitudinally expand the plate and the invention aims further to provide means for automatically longitudinally contracting the feeder plates, or in other words, shortening the plates as a whole as the plates are brought to position for the reception of the unturned work so that the work may be more conveniently placed thereon, the means being further adapted to permit of longitudinal expansion of the plates, or in other words, separation of the sections thereof, after the work has been fitted thereto so as to provide for proper distention or stretching of the work which is essential during the turning operation and to provide against the work being thrown from the plates through centrifugal force.

In the accompanying drawings,

Fig. 4 is a side elevation of the entire machine, parts being broken away;

Fig. 5 is a plan view of the feeder and tumbler plates in relative position immediately prior to their coöperation to turn the work;

Fig. 6 is a plan view illustrating various sizes of the movable sections of the feeder plates;

Fig. 7 is a view partly in front elevation and partly in section of the devices provided for gripping and feeding the lateral edges of the work during the turning operation;

Fig. 8 is a vertical transverse sectional view through the beading press of the machine, the view illustrating the positions of the parts at the time the work is fed into the press;

Fig. 9 is a similar view illustrating the positions of the parts during the formation of the head;

Fig. 10 is a side elevation, parts being shown in section, of the beading press and the operating mechanism therefor, the parts being shown in the position illustrated in Fig. 8;

Fig. 11 is a view similar to Fig. 10 and illustrating the parts in the position shown in Fig. 9;

Fig. 12 is a perspective view of the principal elements of the turning mechanism slightly relatively displaced to better illustrate the structure;

Fig. 13 is a longitudinal sectional view through a portion of the tumbler shaft;

Fig. 14 is a vertical transverse sectional view on the line 14—14 of Fig. 13;

Fig. 15 is a diagrammatic view illustrating the initial step in the turning of the work;

Fig. 16 is a semi-diagrammatic view illustrating the relative positions of the parts comprising the beading press during the step of operation illustrated in Fig. 15;

Fig. 17 is a view similar to Fig. 15 illustrating the next step in the turning operation;

Fig. 18 is a view similar to Fig. 16 illustrating the positions of the parts of the beading press during the step of operation shown in Fig. 17;

Fig. 19 is a view similar to Fig. 15 illustrating the next step in the operation of the machine;

Fig. 20 is a view similar to Fig. 16 illustrating the positions of the parts of the beading press during the step of operation illustrated in Fig. 19;

Fig. 21 is a view similar to Fig. 15 illustrating the first step in the operation of the beading press;

Fig. 22 is a view similar to Fig. 16 illustrating the relative positions of the parts of the beading press during the initial step in the operation of the said press;

Fig. 23 is a view similar to Fig. 15 illustrating the manner in which the beaded article is fed from the beading press to the final press;

Fig. 24 is a view similar to Fig. 15 illustrating the initial operation of the final press;

Fig. 25 is a perspective view of a turned, beaded, and pressed cuff which has been formed through the operation of the machine embodying the present invention;

Fig. 26 is a vertical longitudinal sectional view substantially on the line 26—26 of Fig. 7;

Fig. 27 is a vertical transverse sectional view illustrating a modification in the upper press member of the beading press;

Fig. 28 is an end view illustrating a modification of the final or finishing press;

Fig. 29 is a rear elevation of the friction feed means for the apron which carries the work through the final press.

Figure 1:
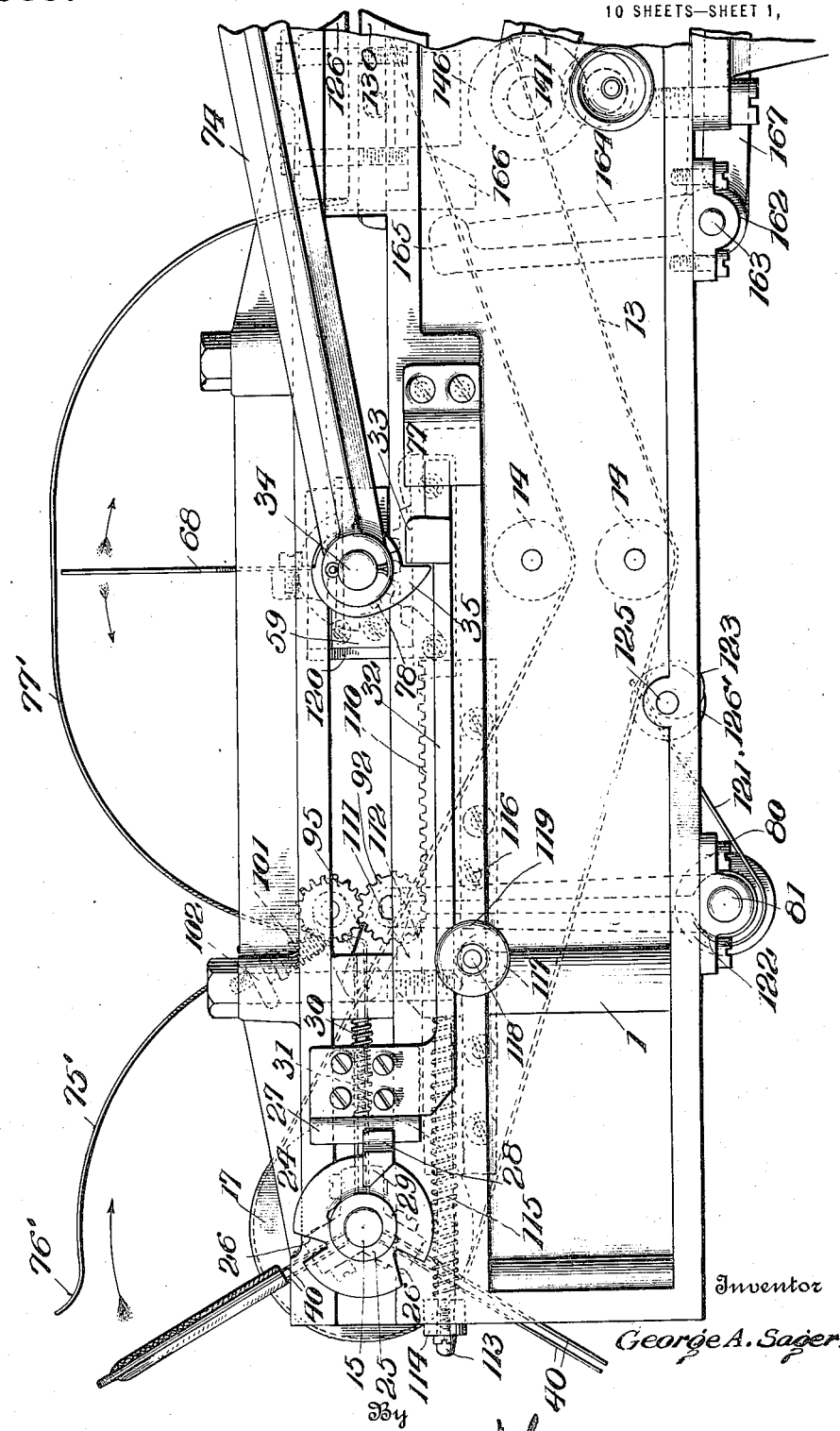
Figure 1 is a side elevation of the forward portion of the machine embodying the present invention.

The machine embodying the present invention may be employed with equal facility in turning collars or cuffs after slight reproportioning of the parts due to the differences in width and length of these articles and therefore wherever in the specific description of the machine which is to follow and in the claims, the term "cuff" or "work" is employed it will be understood that this term includes cuffs, collars, and all similar work.

The several mechanisms embodied in the machine are mounted within a suitable framework which may be of any desired and suitable construction and which includes side members, which are indicated in general by the numerals 1 and 2, the side member 1 being located at the right hand side of the machine and the member 2 at the left hand side of the machine, that end of the machine at which the turning mechanism is located being considered the forward end and the opposite end of the machine being considered the rear end. The power shaft of the machine is indicated by the numeral 3 and this shaft has mounted upon it at one end a pulley or sprocket gear 4 to provide for the application of power from any suitable source. Upon the other end of the said shaft there is fixed a pinion 5, which meshes with a master gear 6 which is fixed upon a main driven shaft 7 mounted in suitable bearings 8 in the side members of the frame. Also fixed upon the main driven shaft 7 is a pinion 9 which meshes with a gear 10 fixed upon a shaft 11 which will be more specifically hereinafter described. Inasmuch as there is a continual application of power to the shaft 3, the shaft 7 will be continuously rotated as also the shaft 11 and fixed upon one end of the shaft 11 is a belt pulley, or if desired a sprocket gear, indicated by the numeral 12. Assuming that the element 12 is a belt pulley, a belt 13 is trained thereover and the stretches of this belt pass beneath idlers 14 mounted upon the side member 2 of the frame of the machine. The belt 13 serves to transmit power to the feeder plate shaft of the turning mechanism as will now be explained.

The feeder plate shaft above mentioned is indicated by the numeral 15 and is mounted in suitable bearings in the side members of the frame and at one end this shaft extends beyond the side member 2 of the frame and has fixed thereon, immediately outwardly of the said side member, a metal collar 16 and loosely mounted upon the said end of the shaft is a pulley 17, a fiber friction disk 18 being interposed between the inner face of the said pulley and the opposing face of the collar 16. Splined upon the shaft 15 outwardly of the pulley 17 is a collar 19 between which and the other face of the pulley is interposed a fiber friction disk 20. The extreme outer end of the shaft is threaded, as indicated at 21, and adjustably fitted thereon is a thumb nut 22, a spring 23 being arranged upon the shaft and bearing at one end against the collar 19 and at its other end against the thumb nut 22. The belt 13 is trained over the pulley 17. It will now be understood that when the shaft 15 is not restrained against rotation and the thumb nut 22 has been adjusted to properly tension the spring 23, the pulley 17 will be frictionally clutched with the shaft and, consequently, the shaft will be rotated upon application of power to the shaft 3. However, the invention contemplates the provision of means for intermittently restraining the shaft 15 against rotation so that the feeder plates may be held stationary as they are successively brought to position for the application of the work thereto and when such restraining means is active and the shaft 15 is positively held against rotation, it will be apparent that the shafts 3, 7 and 11 will continue to rotate as also the pulley 17 so that while means is provided for intermittently holding the shaft 15 stationary, the operation of the mechanisms which depend for their actuation upon the said shafts 3, 7 and 11, is not in any way interfered with.

Figure 3:
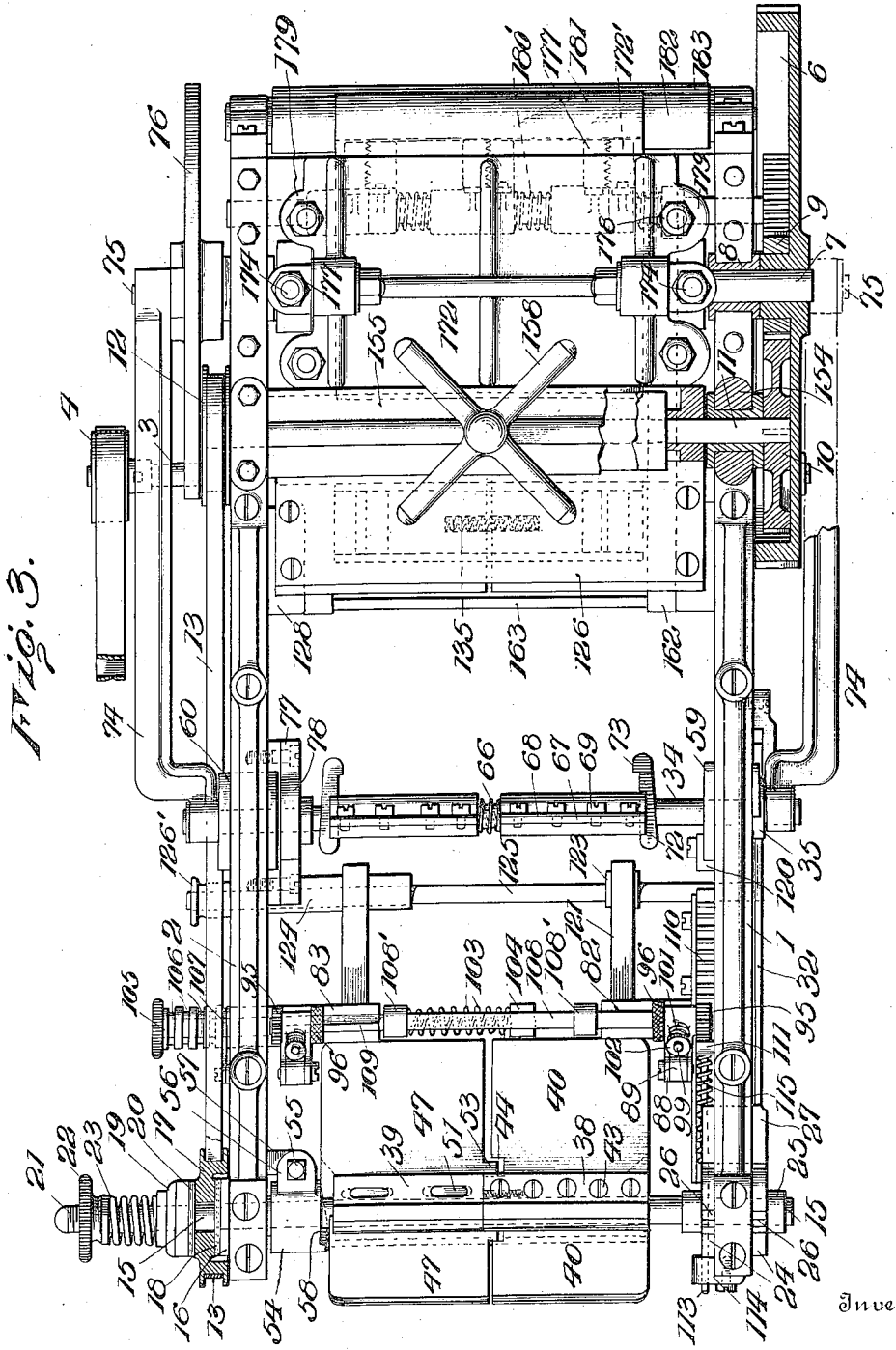
Fig. 3 is a top plan view, partly in section, of the machine.

The restraining means above referred to includes two spaced disks 24 which are fixed upon or integral with a sleeve 25 suitably secured upon that end of the shaft which is journaled in the side member 1 of the frame, these disks being located at the opposite sides of the said side member, as shown in Fig. 3 of the drawings, and each being formed with a peripheral series of notches 26. These disks constitute a keeper for a latch device which will now be described. The latch device includes a slide block 27 which is slidably mounted in any suitable manner within the frame member 1, as clearly shown in Fig. 1 of the drawings, in a manner to permit of its reciprocation toward and from the keeper disks 24 and this block is formed or provided upon its forwardly presented side with a latch tongue 28 having spaced latch lugs 29 formed to enter the corresponding notches 26 in the said disks 24 when the slide block 27 is slid forwardly to the position shown in Figs. 1 and 4 of the drawings. As a means tending to move the slide block 27 forwardly so as to bring the lugs 29 into engagement in the notches 26 of the keeper disks, there is provided a spring 30, the forward end of which is seated within a recess 31 formed in the rear side of the said slide block and which at its rear end bears against any suitably located fixed portion of the frame member 1. At predetermined intervals in the operation of the machine, the slide block is withdrawn rearwardly against the tension of the spring 30 so as to release the shaft 15 to permit of rotation thereof a sufficient distance to bring into proper position the next one of the feeder plates for the application of the unturned work thereto and the means for retracting the said slide block includes a resilient stem 32, which is secured in any suitable manner to the slide block 27 and extends rearwardly therefrom and is provided with an abutment lug 33, and secured upon a shaft 34 which is mounted in a manner to be presently explained both for rotary motion and for reciprocatory motion is a tappet 35 which is designed to coöperate with the abutment lug 33, as will be presently pointed out.

As before stated, the feeder plates are formed in sections and in the specific structure illustrated in the drawings each plate comprises two sections, one of which is fixed and the other movable longitudinally with relation thereto. Assuming that, as illustrated in the drawings, each of the feeder plates comprises a pair of sections, companion sleeves 36 and 37 are fixed in any suitable manner upon the shaft 15 and these sleeves are provided respectively with pairs of radial longitudinally extending flanges 38 and 39. In the present instance the shaft supports three feeder plates which are equidistantly spaced throughout, but it will be understood that a greater or less number of feeder plates may be employed if desired. Each of the fixed feeder plate sections comprises a pair of spaced leaves 40 united at their inner edge portions to a spacing bar 41 which for a purpose to be presently explained has its outer edge at its outer end extended at an angle of inclination, as indicated at 42. The inner edge portion of each of the sections 40 is fitted between the flanges 38 of one of the pairs and secured in place by means of screws or other fastening elements 43. For a purpose to be presently explained the inner lateral edges of the leaves 40 are provided near the flanges 38 with oppositely located notches 44 and each of the fixed feeder plate sections is provided at the inner end of its inner lateral edge with a socket 45 which receives one end of a spring 46, these springs being provided between the fixed and movable sections of the feeder plates for the purpose of expanding the feeder plates, or in other words, yieldably separating the sections comprising each plate. Each of the movable feeder plate sections comprises a pair of leaves 47 disposed at their inner edge portions against opposite sides of a spacing bar 48 which at its outer end has its outer edge inclined at an angle, as at 49, to correspond to the inclined edge 42 of the spacing bars 41. Respective ones of the flanges 38 and 39 are in alinement as will be apparent by reference to Figs. 5 and 12 of the drawings, and, consequently, when the movable feeder plate sections are fitted between the flanges 39 of the several pairs their inner lateral edges will directly oppose the inner lateral edges of the corresponding fixed feeder plate sections 40 and the sections of each plate will occupy a common plane. The movable feeder plate sections 47 are longitudinally slidable within the channel formed between the flanges 39 of each pair so that these sections may have movement toward and away from the respective sections 40 and in order that the sections 47 may be held properly assembled with the flanges 39, the inner edge portions of the leaves 47 and the spacing bar 48 are formed with longitudinally extending slots 50 and keys 51 are fitted through the flanges 39 and through the said slots 50, the slots being, however, of greater length than the keys so as to permit of sliding movement of the sections 47 in the manner above pointed out. The inner lateral edge of each section 47 is formed with a socket 52 which opposes the socket 45 in the respective fixed section 40 and which receives the other end of the spring 46 and each leaf 47 is provided at its said inner lateral edge with projecting portions 53 which project into the notches 44 and serve to prevent lint from the work accumulating within the channels between the flanges 38 and 39, which accumulation would, of course, interfere with sliding movement of the movable feeder plates 47. In order that in the rotation of the shaft 15 the movable feeder plate sections 47 may be moved inwardly as the feeder plates are successively brought into position in front of the operator of the machine for the application of unturned work thereto and in order that the said sections 47 may be allowed to move outwardly whereby to properly distend or stretch the work as the work is brought into position for turning, a cam collar 54 is loosely fitted to the shaft 15 beside the frame member 2 and is held against rotation in any suitable manner, as for example, by a bolt 55 secured through an ear 56 upon the collar and a similar ear or projection 57 upon the said member of the frame, the cam face of this collar 54 being indicated by the numeral 58 and being presented inwardly, or in other words, toward the outer lateral edges of the feeder plate sections 47. The cam face 58 is so formed, as will be understood by reference to Figs. 3, 5 and 12, of the drawings, that as the feeder plates move upwardly and forwardly the sections 47 thereof will be moved inwardly against the tension of the springs 46 and will be held in this position while the shaft 15 is stationary. Upon forward rotation of the shaft to carry the feeder plate with the unturned work thereon to position for turning of the work, the outer lateral edge of the feeder plate section 47 will move past the end of the cam face and the said section will be moved outwardly through the influence of the spring 46 thereby stretching or distending the cuff or other work.

After the unturned work has been placed upon one of the feeder plates by the operator of the machine, the said plate is brought to position for the coöperation therewith of a tumbler plate which constitutes a further element of the turning mechanism, and this tumbler plate has its movements controlled by a mechanism which will now be described. The shaft 34 is journaled in slide blocks 59 and 60 which are mounted for reciprocation within the frame members 1 and 2, respectively, and mounted upon this shaft 34 are sleeves 61 which are split longitudinally and provided with flanges 62 through which bolts or screws 63 are secured for the purpose of closing the said sleeves and also for the purpose of securing in place keys 64 which slidably fit in a groove 65 formed longitudinally in the said shaft 34, the sleeves being in this manner held for rotation with the shaft and yet being capable of movement toward and away from each other. A spring 66 is arranged upon the shaft 34 and bears at its ends against the adjacent ends of the sleeves 61 and tends to separate the said sleeves, or in other words to move the same outwardly along the shaft 34. Each sleeve is formed with radial flanges 67 which extend longitudinally thereof and disposed at its inner edge portion against each of the said flanges is one section 68 of the tumbler plate heretofore referred to, the said plate sections being secured by means of screws or other fastening elements 69. At a point coinciding substantially with the outer end of each sleeve 61, the shaft 34 is formed in its side opposite the side in which the groove or key-way 65 is formed, with a recess 70 and the said outer end of each sleeve is formed with alined notches 71, a wedge key 72 being disposed within each recess 34 and engaging at its inclined side within the said notches 71, as clearly shown in Fig. 13 of the drawings. Each key 72 is provided at its minor end with a lateral head 73 which projects toward the associated sleeve 61 and this head 73 upon each key prevents accidental displacement of the key in one direction and the major or larger end of the key prevents its disengagement in the other direction. It will now be understood that when the minor ends of the keys 72 are within the recesses 70 and notches 71, the sleeves 61 will be held apart or separated by the spring 66, but that on the other hand when the sleeves have been moved toward each other against the tension of the said spring 66 and the major ends of the keys are seated in the recesses 70 and notches 71, the sleeves will be held against outward movement through the influence of the said spring. As will be presently explained the keys are designed to assume one or the other of the two positions above mentioned, by gravity, during various steps in the operation of the machine. Pivotally connected to each end of the shaft 34 outwardly of the frame members 1 and 2, is the forward end of a pitman 74, the rear end of each pitman being connected to a crank pin 75, one of the crank pins being formed or secured upon the gear 6 and the other upon a crank disk 76 fixed upon that end of the shaft 7 opposite the end which carries the gear 6. Consequently, as the shaft 7 is rotated, reciprocatory motion will be imparted to the slide blocks 59 and 60 and, consequently, to the shaft 34 journaled therein. In order, for a purpose to be presently described, that the shaft 34 may be oscillated during its reciprocatory motion, a rack 77 is fixed upon the side member 2 of the frame of the machine and a segmental gear 78 is fixed upon the corresponding end of the shaft 34 inwardly of the slide block 60 and meshes with the said rack 77 at predetermined intervals in the reciprocatory motion of the slide blocks. At this point it may be noted that the outer corners of the sections 68 comprising the tumbler plate are rounded, as indicated by the numeral 79, so as to not only prevent injury to the work during the turning operation, but also to coöperate with the inclined edges 42 and 49 of the spacing bars of the feeder plates, as will be hereinafter pointed out.

In order that the edge portions of the plies of the work beyond the line of stitching at the forward edge of the work may be deflected so as to permit of proper engagement of the edge of the tumbler plate against the work to so locate the said edge portions within the turned work as to form the desired bead, a curved deflector plate 75' is mounted in any suitable manner within the frame of the machine and has its forward and upper edge upwardly curved, as at 76', and located in the path of travel of the said edge portions of the work as the work is carried around by the feeder plates in a rearward direction. The deflector plate 75' is curved on an arc concentric to the shaft 15 and the rear and lower edge of this plate terminates slightly above the upper sides of the lower gripping rolls 93.

An arcuate guard plate 77' is preferably provided and extends from the said rear and lower edge of the deflector plate 75' rearwardly approximately on the arc of a circle and terminates at its rear and lower edge slightly above the lower member of the beading press, as clearly shown in Fig. 1 of the drawings.

In the detail description of the machine which will presently be given, it will be pointed out that the tumbler plate 68, in the turning operation, is to enter between the leaves of the feeder plate sections for the purpose of turning the work inside out, and in order that this operation may be assisted and that the work may be fed on to the tumbler plate, mechanism is provided for gripping and feeding the lateral edges of the work during the turning operation and this mechanism will now be described. Mounted for oscillatory movement in suitable bearings 80 upon the frame members 1 and 2, is a shaft 81 and fixed upon this shaft inwardly of the frame member 1 is a sleeve 82. A similar sleeve 83 is slidably mounted upon the said shaft inwardly of the frame member 2 and is yet held for oscillation with the shaft by a key 84 carried by the sleeve and working in a key-way 85 formed in the said shaft. Each of the sleeves 82 and 83 carries an upstanding rock arm 86 having its upper end turned forwardly, as indicated by the numeral 87, the said forwardly turned upper end being bifurcated to form spaced portions 88 between which is pivoted one end of a short arm 89. Each arm 86 is provided, at its juncture with its forwardly turned end 87, with a bearing 90 and rotatably mounted within the bearing 90 of each arm is a sleeve 91 carrying at one end a pinion 92 and at its other end a gripping roll 93 having a serrated periphery. In a like manner the free end of each arm 89 is provided with a bearing rotatably receiving a spindle 94 carrying at one end a pinion 95 meshing with the respective pinion 92 and at its other end a gripping roll 96 having a serrated periphery to coöperate with the periphery 93. The arm 89 is provided upon its upper side with a seat 97 in which is removably secured the lower end of a post 98, the upper portion of which is threaded, as at 99, and extends loosely through a sleeve 100 integral with the said arm 89. A spring 101 is fitted to the threaded upper end of each post 98 and a thumb nut 102 is adjustably threaded upon the said end of each post and may be rotated so as to adjust the tension of the spring and cause the upper gripping rolls 96 to bear more or less firmly against the corresponding lower rolls 93. The gripping rolls upon the arm are located at the outer ends of the feeder plate sections 40 so as to grip and feed the corresponding lateral edges of the work during the turning operation and in order that the gripping rolls upon the other arm 86 may be properly positioned to grip the outer lateral edges of the work when feeder plates for one size of work are substituted for those of another size, means is provided whereby the sleeve 83, which supports the last-mentioned arm 86, may be adjusted longitudinally upon the shaft 81. This sleeve is normally held outwardly upon the shaft by means of a spring 103 arranged upon the shaft and bearing at one end against the inner end of the sleeve and at its other end against a collar 104 fixed upon the said shaft. The outer end of the sleeve bears against a sleeve 105 which is formed with a series of circumscribing grooves 106, the sleeve being slidably fitted upon the shaft and through a suitable bearing in the frame member 2. The sleeve 105 may be adjusted so as to adjust the sleeve inwardly against the tension of the spring 103 or it may be permitted to move outwardly upon the shaft 81 through the influence of the said spring, and the sleeve 105 is held at adjustment by means of a pivoted detent 107 engageable in the grooves 106 selectively. In order that rotary motion imparted to one of the pinions 92 may be transmitted to the other pinion 92 and to both of the pinions 95, a shaft 108 is fixed at one end in the sleeve 91 upon which the first-mentioned pinion 92 is mounted and this shaft is provided at its other end with a reduced squared portion 109, which slidably fits within the square bore of the sleeve 91 upon which the other pinion 92 is mounted, this latter pinion being the one which is associated with the arm 86 which is carried by the sleeve 83. Therefore, when the first-mentioned pinion 92 is rotated, rotary motion will be imparted to the other pinion 92 in all positions of adjustment of the sleeve 83 due to the engagement of the squared end 109 of the shaft 108 in the correspondingly formed bore of the last-mentioned sleeve 91. Rotary motion being imparted to the pinons 92 and 95, the gripping rolls 93 and 96 will be, of course, correspondingly rotated. The means provided for rotating the first-mentioned one of the pinions 92 includes a rack 110 which is mounted for reciprocatory motion upon the inner side of the frame member 1 of the machine in any suitable manner and this rack is provided at the forward end of its toothed upper edge with an upstanding boss 111 the rear side of which is concaved as at 112 to conform to the peripheral curvature of the pinion 92. Extending from the forward end of the rack 110 is a stem 113 which fits slidably through a bearing 114 supported at the forward end of the frame member 1, and fitted to the said stem and bearing at its forward end against the bearing 114 is a spring 115, which spring at its rear end bears against the forward end of the rack bar proper 110. For a purpose to be presently set forth the arms 86 are adapted to have limited oscillatory movement and this movement is limited in one direction by a stop pin 116 upon the frame member 1, with which pin the corresponding rock arm 86 coöperates in the manner shown in Fig. 7 of the drawings, the arm being held normally in this position through the influence of the spring 115 which holds the rack bar 110 rearwardly and with the concave face 112 of the boss 111 resting against the periphery of the associated pinion 92. The oscillatory movement of the arm in the opposite direction is limited by a stop cam 117 which is fixed upon a shaft 118 which may be rotatably adjusted through the medium of a milled head 119 fixed upon one end thereof. In order that the rack bar 110 may be reciprocated in a forward direction against the tension of the spring 115, an abutment member 120 is secured upon the slide block 59 and, in the forward reciprocation of this block, is designed to strike against the rear end of the said rack bar and move the same in a forward direction. As the rack bar is so moved, the concave face 112 of the boss 111 will cease to bear rearwardly against the pinion 92 with which it coacts and the shaft 81 will be rotated so as to swing the arms 86 forwardly to bring the gripping rolls into proper position to engage and grip the lateral edges of the work, through the influence of leaf springs 121, secured at one end, as at 122, one to each of the sleeves 82 and 83 and extending rearwardly and resting against cams 123 and 124, respectively, located opposite the sleeves 82 and 83. These cams are located upon a shaft 125 which is rotatably adjustably mounted within the frame members 1 and 2 and is provided at one end with a finger knob 126' whereby it may be rotated so as to adjust the cams 123 and 124 to vary the tension of the springs 121. Thus, as the rack bar 110 is moved forwardly against the tension of the springs 115 the arms 86 will rock forwardly until the arm at the right hand side of the machine comes into contact with the stop cam 117. Of course, upon continued forward movement of the rack bar 110 rotary motion will be imparted to the pinion 92 which is in mesh therewith and, therefore, the grip rolls 93 and 96 will be rotated while they grip the lateral edges of the work. Of course, upon rearward reciprocation of the slide blocks 59, the rack bar 110 will be reciprocated rearwardly through the influence of the springs 115, thereby causing reverse rotation of the gripping rolls until the face 112 of the boss 111 comes into engagement with the pinion 92 with which it coacts at which time the further rearward motion of the rack bar will result in rearward rocking of the arms 86 until arrested by the stop pin 116.

Figure 2:
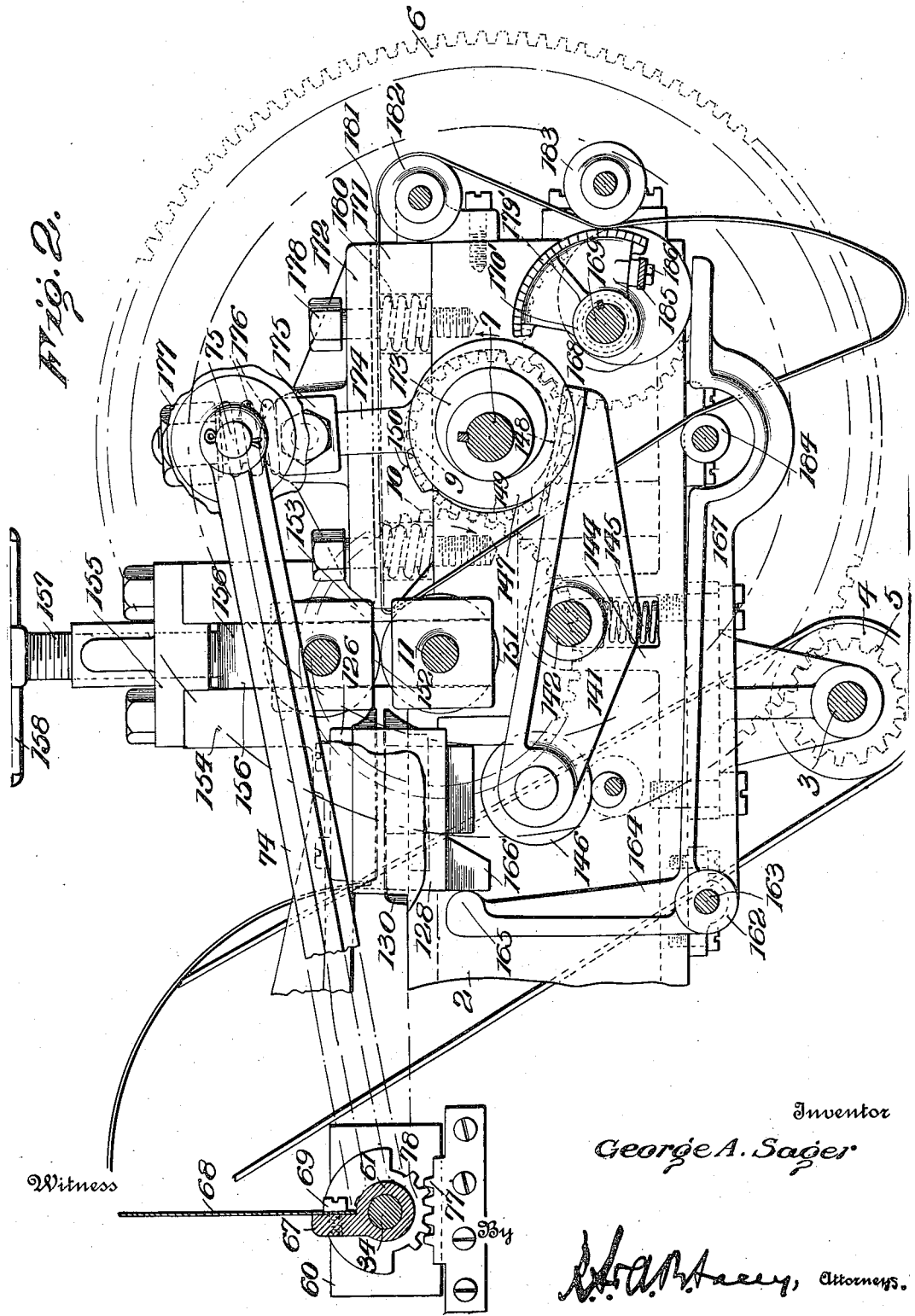
Fig. 2 is a detail vertical longitudinal sectional view through the rear portion of the machine.

As will be explained, in the detail description of operation of the machine, after the turning operation the work is delivered by the tumbler plate to the beading press of the machine in which press the work is initially pressed and at the same time the beads at the lateral edges of the work are formed. The beading press, above referred to, includes a relatively fixed upper press member, indicated by the numeral 126 which member has a flat underface provided with a facing 127 of any suitable padding and friction material, such for example as cloth. This upper press member 126 is disposed at its ends upon the ends of a frame 128 which is slidably mounted for backward and forward reciprocation upon the frame members 1 and 2 and the said ends of the press member are secured in place by bolts or other suitable fastening devices 129. The lower press member comprises two sections 130 mounted in the frame 128 and each having a flat upper surface 131 provided with a facing 132 corresponding to the facing upon the underside of the upper press section 126 and each of the said sections 130 is provided at its outer end with an extension 133 vertically movable in a recess formed in the corresponding end of the frame 128. The sections 130 are yieldably held separated by means of a spring 135 which seats at its ends in sockets 136 formed in the inner or adjacent ends of the said sections. In order that the sections may be brought together against the tension of the springs 135, the sections are provided at their outer ends with inclined faces 137 which are contacted by the inclined faces 138 of bosses 139 provided at the ends of a follower 140 which is adapted to be forced upwardly under conditions to be presently explained so as to bring the said sections 130 together through the coaction of the faces 137 and 138 and at the same time cause the lower press members comprising the sections 130 to exert pressure against the upper press member 126. In order that the follower 140 may be moved upwardly in the manner and for the purpose stated, rockers 141 are provided with trunnions 142 which are journaled in bearing blocks 143 which are mounted for vertical movement in bearings 144 upon the side members of the frame and are yieldably supported in elevated position by springs 145. The forward end of each rocker carries a roller 146 and these rollers bear against the underside of the follower 140 in the manner most clearly shown in Figs. 2, 10 and 11 of the drawings. Fixed upon the shaft 7 are two multiple arc cams 147 and the faces of each cam are indicated by the numerals 148, 149 and 150, the faces being, in the order mentioned, located successively more remote from the axis of the cam. The cams 147 are designed to have their faces ride over the upper sides of the respective rockers 141 at the rear ends thereof in the manner shown in the said figures and it will be understood that when the face 148 of each cam is traveling over the rear end of the respective rocker 141, the lower press member, or more specifically, the sections 130 comprising the same, will be in lower position. When the faces 149 of the cams are traveling over the ends of the respective rockers, however, as shown in Fig. 11 of the drawings, the lower press member will be forced upwardly to exert pressure upon the work which has at such time been fed between the press members at the same time moving the members 130 together to form the bead at the ends of the work, and, when the faces 150 of the cams are riding over the ends of the respective rockers, this pressure will be increased, thus setting the beads after the tumbler plate has been withdrawn. In the detail description of operation of the machine, which will presently be given, the object in view in exerting different degrees of pressure upon the lower press member and the results which are accomplished thereby will be fully explained.

After the work has been acted upon by the beading press it is to be delivered to the final press and for this purpose there is arranged, between the two presses, a pair of rolls, one indicated by the numeral 151 and the other by the numeral 152. The roll 151 is fixedly mounted upon the shaft 11 and, consequently, rotates with the said shaft, and the roll 152 is provided with trunnions which are rotatably mounted in suitable bearings 153 slidably arranged within guides 154 between the upper ends of which extends a cap plate 155. The bearings 153 are bridged by a member 156, and a pressure screw 157 is threaded through the cap plate 155 and provided at its upper end with a handle 158 whereby it may be rotated so as to increase or decrease the pressure exerted by the upper roll upon the lower roll. In order that the beading press may be moved sufficiently close to the rolls 151 and 152 to insure of feeding of the work between the rolls, the rear edge of the upper press member 126 is concaved, as indicated by the numeral 159, to conform to the curvature of the surface of the upper roll and the corresponding edges of the sections 130 of the lower press member are likewise concaved as at 160, to conform to the curvature of the surface of the lower roll. The beading press is normally held in position shifted away from the rolls 151 and 152 by means of springs 161 and in order that the said press may be shifted toward the rolls against the tension of the springs 161, angle levers 162 are mounted upon a shaft 163 which is in turn mounted beneath the frame members 1 and 2 and each lever includes an upstanding arm 164 having a head 165 coacting with a depending boss 166 upon the underside of the adjacent block 128. The other arm of each angle lever, indicated by the numeral 167, extends rearwardly from the shaft 163, as clearly shown in Figs. 2 and 10 of the drawings. Cams 168 are fixed upon a shaft 169 which is mounted for rotation in suitable bearings upon the side members of the frame of the machine and these cams are designed, in the rotation of the said shaft, to ride over the upper sides of the rear ends of the arms 167 whereby to rock the arms 164 in a rearward direction and shift the beading press into coöperative relation with respect to the rolls 151 and 152. The shaft 169 is rotated through the medium of a gear 170 which is fixed thereon and which meshes with the gear 9 upon the shaft 7.

The final or finishing press comprises a lower press member indicated by the numeral 171, which member is supported and secured in any suitable manner upon the side members of the frame, and on upper press member 172 which coöperates therewith. In order that the upper press member 172 may be forced in a downward direction so as to exert pressure upon the work as it is fed between the upper and lower members, eccentrics 173 are fixed upon the shaft 7 below the ends of the press member 172 and from the straps of these eccentrics lead rods 174 which extend upwardly through oscillatory collars 175 mounted upon the press member 172 at the ends thereof. A compression spring 176 is fitted to the upper end of each rod 174 and nuts 177 are threaded onto the ends of the said rods and may be adjusted to vary the tension of the springs 176, it being understood that as the shaft 7 is rotated and the eccentric rods 174 move downwardly, the upper press member 172 will be forced downwardly to exert pressure upon the work passing the press members and the springs 176 will compensate for variations in thickness in the work. In order that, while the work is being fed between the press members, the upper press member 172 may be supported in elevated position to give clearance to the work, stud bolts 178 are fitted through ears 179 at the ends of the press member 172 and springs 180 are arranged upon these bolts and bear at their lower ends upon the supporting structure for the lower press member 171 and at their upper ends bear upwardly against the underside of the ears 179.

It is contemplated that the work shall be fed with a step by step movement through the final or finishing press so that each piece of work may be pressed a number of times before delivery from the press, and in order that this may be accomplished an endless apron 181 is led rearwardly across the upper face of the lower press member 171 and over an idle roll 182 and over the forward side of a similar roll 183 mounted below the roll 182, both of these rolls being arranged upon the rear end of the frame of the machine. The endless apron also passes over an idle roll 184 mounted upon the underside of the machine which roll serves to prevent the upwardly traveling forward stretch of the apron from coming in contact with any of the moving parts of the machine and also serves to maintain the said stretch clear or out of contact with the lower feed roll 151.

The shaft 169 carries friction segments which are designed to coöperate with the apron 181 and feed the said apron past the roll 183 and each of these segments includes a section which is fixed with relation to the said shaft and a section which is angularly adjustable about the shaft so that the arcuate length of the friction surface may be varied to vary the distance which the apron 181 is caused to travel during each revolution of the said shaft 169. The fixed section of each segment includes a sleeve 170' which is keyed or otherwise secured upon the shaft and a web 171' extends radially from the said sleeve and supports at its outer end an arcuate head 172' having a friction surface 173', the head at one lateral edge being provided with a series of teeth 174'. The movable or adjustable section of each segment includes a sleeve 175' which is slidably and rotatably mounted upon the said shaft 169 and supports a web 176' carrying an arcuate head 177' having a friction face 178' and provided at one lateral edge with a series of teeth 179' designed to coact with the teeth 174' in a manner to be presently explained. The sleeves 175' are normally held in engagement with the adjacent ends of the respective sleeves 170' by means of springs 180' arranged upon the said shaft and bearing between the sleeves 175' and the other ends of the adjacent sleeves 170' or against suitable collars 181' fixed upon the shaft. A bar 185 is disposed against the rear edges of the webs 176' of all of the adjustable sections of the segments and is secured thereto by means of suitable bolts as indicated at 186. It will now be understood that when the front and rear ends of the heads of the two sections of each segment are in registration or are, in other words, located opposite each other, the friction face of each friction segment will be of minimum angular length, but where a relatively deep cuff is to be carried through the final press it is essential that the distance traveled by the apron 181 be increased and in order that this may be accomplished the bar 185 is grasped and is moved laterally carrying with it all of the adjustable sections of the segments, the said sections being, of course, moved against the tension of the spring 180'. When the teeth 179' have been brought clear of the teeth 174', the bar is swung in a direction circumferentially of the shaft so as to adjust the adjustable segments angularly about the shaft simultaneously and when the arcuate length of the friction faces of the several friction segments has been increased to the desired extent, the bar 185 is released and the springs 180' will return the adjustable sections of the segments to their normal position. Thus as the shaft 169 is rotated, the friction segments 185, in passing the roll 183, will feed the apron 181 a predetermined distance after which the press member 172, by reason of the relative arrangement and proportioning of the parts, will be lowered to press the piece of work which has just been fed into the press by the feed rolls 151 and 152. After the press member 172 has returned to its elevated position, the apron will again be advanced a predetermined distance and its stretch which travels above the lower press member 161 will carry with it the said piece of work, the movement of the apron being interrupted when the work has been brought to position substantially mid-way between the front and rear of the press. The work will then be again pressed through the downward movement of the upper press member 172 and upon upward movement of this press member the work will again be fed a predetermined distance and will again be subjected to pressure after which and upon further travel of the apron, the work will be discharged in finished condition from the machine. In the meantime another piece of work will have been fed into the press and will be subjected to the successive steps of pressing above described.

In the structure previously described the work is cold pressed in the beading and final presses but if desired either or both of these presses may be heated by electricity, gas, or any other suitable means and in that form of the invention shown in Fig. 27 of the drawings the upper press member 126 of the beading press is provided with a heating chamber 187 and in Fig. 28 of the drawings the upper member 172 of the final or finishing press is provided with heating chambers 188.

In the foregoing description and in the claims which are to follow by reference to "turning" of the work I mean that the unfinished work is reversed or so manipulated that the "right" or "facing" sides of the plies which are to form the outer plies of the completed cuff will be presented outermost when the operation referred to is completed. By reference to "beading" in the foregoing specification and claims which are to follow I mean the manipulation of the work at the forward and lateral edges thereof in such manner as to cause the inner facing ply and the lines of stitching uniting the same to the other plies, to lie a short distance inwardly from the true forward and lateral edges of the work so that the life of the cuff or other piece of work will be prolonged.

The operation of the machine embodying the present invention is as follows:

As before stated, when the shaft 15 is rotated, the feeder plates are successively brought into position before the operator of the machine for placing of the work thereon and as the plates are brought to this position the outer lateral edges of the movable sections 47 of the plates riding over the cam face 58 of the collar 54, will be moved inwardly against the tension of the springs 46 so that the plate which is to receive the work is longitudinally contracted and occupies the position indicated by the letter $b$ in Fig. 15 of the drawings, the several sets of plates in this figure and the corresponding figures being indicated arbitrarily by the letters $a$, $b$ and $c$. The operator, in applying the work to the plate $b$ will so fit the work to the plate that the leaves of the plate will be received between the pacing plies of the unturned work. As illustrated in Fig. 15 of the drawings an unturned cuff has been applied to the plate $a$ and the shaft 15 has been rotated rearwardly a sufficient distance to bring this plate to the position shown in the said figure. As this plate passed the end of the cam face of the collar 54, the section 47 of the plate was moved outwardly longitudinally so as to longitudinally expand the plate and thereby stretch the unturned work so as to not only hold the same taut and in proper condition for the turning operation, but also to prevent the work leaving the plate due to contrifugal force attending its rotation. As the plate $a$ rotated rearwardly the forward edge portion of the plies of the cuff or other work were deflected by the plate 75′ and its curved forwardly presented edge portion 76′ so that when the plate arrived in the position, as shown in Fig. 15 of the drawings, this projecting edge portion of the work remained deflected upwardly at a slight angle by reason of its engagement against the rear edge portion of the said deflector plate. With the plate $a$ in this position the shaft 15 is restrained against further rotation through the engagement of the latch teeth 29 in the notches 26 of the detent disks 24. In the meanwhile the tumbler plate 68 has assumed the position shown in the said Fig. 15, being limited in its downward swinging movement and properly positioned for coöperation with the spaced leaves of the plate $a$ by engagement with rollers 108′ upon the shaft 108. In the continued operation of the machine the slide blocks 59 will be slid forwardly through the forward movement of the pitman rods 74 and the plates 68 will be caused to enter between the leaves of the plate $a$ in the manner shown in Fig. 17 of the drawings, the sleeves carrying the sections of the tumbler plate 68 having been, in the previous operation of the machine as will be presently set forth, moved together and held by the keys 72, so as to permit the said tumbler plate to freely enter the cuff or other work as the same is turned. By reference to Fig. 15 it will be observed that the entering edge of the tumbler plate 68 is so positioned that upon forward reciprocation of the plate, as above stated, the said edge of the plate will engage the work immediately below the line of stitching at the forward edge thereof due to the fact that the forward edge portion of the work is deflected upwardly. Therefore, as the work is fed by the tumbler plate over the edges of the leaves of the feeder plate $a$ and between the said leaves, a single one of the facing plies of the work will lie above the tumbler plate 68 and the other facing ply and the two or more backing or filler plies will lie below the said tumbler plate while the latter is entering between and withdrawing from the feeder plates. As the slide blocks 59 and 60 are reciprocated forwardly to cause the tumbler plate to enter between the leaves of the feeder plate, the abutment 120 will engage against the rear end of the rack bar 110 and the said rack bar will be moved bodily forwardly. In this movement of the bar, as previously pointed out, the rock arms 86 will be swung forwardly through the influence of the springs 121 until the right hand one of the said arms reaches the cam abutment 117 whereupon such movement of the arms will be arrested and upon continued forward movement of the rack bar 110 against the tension of the spring 115, rotary motion will be imparted to the upper and lower gripping rolls 93 and 96 in the manner heretofore described and these rolls will grip the opposite lateral edges of the cuff or other work and will prevent displacement of the work as the same is being turned and transferred to the tumbler plate 68, the peripheral speed of the rollers being equal to the speed of forward movement of the said tumbler plate. It will be understood that as the tumbler plate enters between the leaves of the feeder plate $a$, the work will be drawn over the forward and lateral edges of the said leaves and reversed or turned so that the facing sides of the facing plies will be outermost when the work has been completely transferred to the tumbler plate. It will also be understood that as the tumbler plate enters between the leaves of the feeder plate carrying with it the work, the frictional engagement of the plies of the work with the said tumbler plate and the leaves of the feeder plate will cause the single ply of the work to be drawn back along the longitudinal edge of the work as the work is turned, as clearly shown in Fig. 17 of the drawings, the other plies of the work being forced slightly forwardly beyond the line of stitching, however, so as to form the required bead at the forward longitudinal edge of the work. As the tumbler plate approaches the limit of its forward reciprocatory motion, the rounded corners 79 of the said plate will ride against the inclined edge portions 42 and 49 of the spacing bars for the leaves of the fixed and movable feeder plate sections 40 and 47 and the plate sections 68 together with the respective sleeves 61 will, therefore, be moved toward each other against the tension of the spring 66. At this time the major ends of the keys 72 are lowermost and, consequently, as the sleeves 61 are moved toward each other the keys will drop by gravity so that their minor ends will occupy the recesses 70 and notches 71 in the shaft 34 and sleeve ends respectively and, consequently, in the return or rearward movement of the tumbler plate at the time of its withdrawal from between the feeder plate leaves, the sleeves 61 will be permitted to expand or move outwardly upon the shaft 64 through the influence of the spring 66 and the plates 68 will be correspondingly moved so as to distend or stretch and snugly fit within the turned work, thereby insuring against displacement or withdrawal of the work from the tumbler plate during the time the plate is moving from the position shown in Fig. 17 to the position to feed the work to the beading press. As the slide blocks 59 and 60 are moved rearwardly through the rearward movement of the pitman rods 74 in the act of withdrawing the tumbler plate from between the leaves of the feeder plate, the rack bar 110 will be correspondingly moved through the influence of the spring 115 and the gripping rolls 93 and 96 will be rotated in a direction reverse of that in which they were rotated in the forward movement of the said rack bar. As the rack bar 110 reaches the limit of its rearward movement, the concave face 112 of the boss 111 will engage the adjacent one of the pinions 92 and further movement of the rack bar under the influence of the spring 115 will be arrested through engagement of the adjacent arm 96 against the stop pin 116.

As the rearward travel of the slide blocks 59 and 60 continues, the segmental gear 78 will mesh with the rack 77 and the tumbler shaft 34 and the plates 68 carried thereby will be swung upwardly and rearwardly through an arc of approximately 180°, the work being carried by the said plate 68 beneath the guard plate 77'. This step in the operation of the machine is clearly shown in Fig. 19 of the drawings. As the tumbler plate 68 completes its rearward tumbling motion its entering edge is brought to rest upon the forward edge portion of the lower member 130 of the beading press which edge portion projects forwardly beyond the corresponding edge portion of the upper press member 126. In the continued rearward travel of the slide blocks 59 and 60, the tumbler plates 68, together with the turned work thereon will enter between the upper and lower members of the beading press and at such time the face 148 of the multiple arc cam 147 will be in active engagement with the rear end of the rocker 141 and the follower 140 will be lowered to the position shown in Figs. 8 and 20 of the drawings, in which position of the rocker the sections 130 of the lower press member are relatively separated and in full lowered position. Before return or forward reciprocation of the tumbler plate, or in other words, before the plate is withdrawn from the work, the face 149 of the cam 147 will, in the rotation of the shaft 7, be caused to ride over the end of the rocker 141 and the follower 140 will be forced upwardly. In the upward movement of the follower and as the inclined faces 138 ride against the inclined faces 137 of the sections 130 of the lower member of the beading press, these sections will be moved together against the tension of the spring 135, as shown in Figs. 9 and 22 of the drawings, and at the same time the said lower press member will coact with the upper press member 126 to initially press the work. As heretofore stated the working faces of the press members 130 and 126 are provided with suitable facings of friction material and as the tumbler plate 68 is still in position between the facing plies of the turned work, and that particular facing ply, which is alone at one side of the said plate, is resting upon the working face of the lower press member. When the sections of this press member are brought together this ply will be longitudinally drawn inwardly from the ends or contracted so as to draw the same over the lateral edges of the said plate 68, thereby forming the required beads at the lateral edges of the work. This step in the operation of the machine is clearly shown in Figs. 8 and 9 of the drawings. When the shaft carrying the tumbler plate 68 is in the position shown in Fig. 21 the minor ends of the keys 72 will be lowermost. As the ply of the work above referred to is drawn over the lateral edges of the plate 68, the sections comprising the plate and also the sleeves carrying the said sections will be moved toward each other, or against the tension of the spring 66 and the keys will then drop by gravity to position with their major ends seating in the recesses 70 and notches 71 in the shaft 34 and outer ends of the sleeves 130

61, respectively, and, consequently, while the work is still held between the press members, the tumbler plate 68 will be contracted longitudinally sufficiently to permit of its retraction from the work, the work being held in the meantime against displacement by reason of the friction faces of the press members. As the tumbler plate 68 is withdrawn from the work, the cam face 150 will ride over the end of the rocker 141 and the follower 140 will be further forced in an upward direction so as to cause the lower press member to exert increased pressure against the work, thereby rendering it certain that the beads at the edges of the work will retain their proper shapes. Immediately following the period of coaction of the cam face 150 with the rocker 141, the cam 168 will coact with the rear end of the arm 167 swinging this arm in a downward direction and swinging the arm 164 in a rearward direction whereby to bodily move the beading press in a corresponding direction. In such movement of the beading press, the concaved rear edges of the upper and lower members thereof will be brought close to the rolls 151 and 152 and as these rolls are continuously rotating, the forward edge of the work will engage therebetween and the work will be delivered by the said rolls to the final or finishing press. At this point it may be stated that as the turned work is fed between the upper and lower members of the beading press in the rearward reciprocation of the tumbler plate 68, the double ply of the work heretofore referred to will be stretched over the entering edge of the said tumbler plate, thereby further insuring of proper formation of the bead at the forward edge of the work. Also it will be observed, by reference to Fig. 21 of the drawings, that the said forward edge of the work is fed a sufficient distance beyond the rear edges of the upper and lower press members to insure of its being gripped between the rolls 151 and 152 and it may be further stated at this point that these rolls may be of any suitable material and in themselves may be considered as means for pressing the work. In the several diagrammatic views, Figs. 16, 18 20 and 22 illustrate the positions of the members of the beading press during the steps in the operation of the machine illustrated in Figs. 15, 17, 19 and 21, respectively. After the tumbler plate has been withdrawn from the work and from between the members of the beading press, and the slide blocks 59 and 60 continue to move forwardly, the segmental gear 78 will again mesh with the rack 77 and the shaft 34 will be partly rotated so as to swing the tumbler plate forwardly as it is reciprocated in the direction stated, this operation being clearly shown in Fig. 23 of the drawings. During the previously described steps of operation of the machine, the feeder plate b has remained stationary as in Figs. 15, 17, 19 and 21 of the drawings and in the meantime the operator of the machine has placed an unturned piece of work thereon. As the shaft 34 rotates in a forward direction during the step in the operation of the machine illustrated in Fig. 23 of the drawings, the tappet 35 will be swung around and will strike the abutment 33 upon the stem 32, thereby moving the slide block 27 and retracting the latch teeth 29 from engagement in the notches 26 of the keeper disks 24. The shaft 15 will then be free to rotate and as the tumbler plate is brought into position for the turning operation the feeder plate b will be moved rearwardly so as to occupy the position previously occupied by the feeder plate a, as shown in Figs. 23 and 24 of the drawings. As the feeder plate b reaches the position shown in Fig. 4 or immediately prior to such time the tappet 35 will ride past the abutment 33, the resilent stem 32 being sprung slightly downwardly and the spring 30 will then slide the block forwardly so as to cause the teeth 29 to enter the next notches in the disks 34, thereby holding the shaft 15 against rotation while the steps in the operation of the machine illustrated in Figs. 15, 17, 19 and 21 are being carried out.

At the time the turned and beaded work is being fed by the rolls 151 and 152 to the final or finishing press as shown in Fig. 23 of the drawings, the upper press member 172 is in elevated position, as shown in this figure, and the apron 181 is traveling rearwardly above the lower press member 171 through the action of the friction segments 185, as heretofore described. As these segments cease to act upon the apron and the apron becomes stationary with the piece of work located thereon between the upper and lower press members near the forward sides thereof, the eccentrics 173 will be in such position and rotating in such direction as to pull downwardly upon the eccentric rods 174, thereby causing the upper press member 172 to exert pressure upon the piece of work. As the eccentric rods 174 move upwardly and the upper press member 172 is returned to elevated position, the friction segments 185 again move the apron in a rearward direction over the surface of the lower press member a sufficient distance to bring the work to position about mid-way between the front and rear of the press. In the meantime another piece of turned and beaded work has been delivered onto the apron 181 and is occupying the position previously occupied by the first-mentiond piece of work. Therefore, when the press member 172 is again lowered the first piece of work will be subjected to pressure a second time and the last-mentioned piece of work will be subjected to pressure for the first time. As the press member 172 is again moved upwardly and the apron 181 is moved over the press member 171, the first piece of work will be brought to position between the press members at the rear of the press, the second-mentioned piece of work will be brought to the position previously occupied by the first-mentioned piece of work and another piece of work will have been fed onto the apron to occupy the first position occupied by the second-mentioned piece of work. Then when the press member 172 is again lowered, the first-mentioned piece of work will be subjected to pressure for the third time, the second-mentioned piece of work to pressure for the second time and the third-mentioned piece of work to pressure for the first time. Of course, in the further rotation of the apron 181 the first-mentioned piece of work will be discharged from the machine.

It will be understood that the rounded corners of the tumbler plates serve also as a means for forming round corners upon the cuff and that the shape of these corners may be varied in any manner desired.

Having thus described the invention, what is claimed as new is:

1. In a machine of the class described, means for turning a cuff, collar or like work and simultaneously beading an edge thereof, means for pressing the work, and means for delivering the work from the turning means to the pressing means.

2. In a machine of the class described, means for turning a cuff, collar or like work and simultaneously beading an edge thereof, and means for beading other edges of the work, an element common to both of said means constituting means for delivering the work from the first mentioned means to the last mentioned beading means.

3. In a machine of the class described, means for turning a cuff, collar or like work and simultaneously beading an edge thereof, and means for pressing the work and simultaneously beading another edge thereof, an element common to both of said means constituting means for delivering the work from the turning means to the second mentioned means.

4. In a machine of the class described, means for turning a cuff, collar or like work and for simultaneously beading the forward edge of the said work, and means for beading the lateral edges of the work, an element of the first-mentioned means constituting means for delivering the work from the first to the second mentioned means.

5. In a machine of the class described, means for turning a cuff, collar or like work and simultaneously beading the forward edge of the said work, and combined means for pressing the work and beading the lateral edges thereof, an element common to both of said means constituting means for delivering the work from the first to the second mentioned means.

6. In a machine of the class described, means for turning a cuff, collar or like work and simultaneously beading an edge thereof, means for beading another edge of the work, an element common to both of said means constituting means for delivering the work from the first to the second mentioned means, and means for finally pressing the work.

7. In a machine of the class described, means for turning a cuff, collar or like work and simultaneously beading the forward edge thereof, combined means for pressing the work and beading the lateral edges thereof, and means for finally pressing the work.

8. That method of beading the edges of a turned multi-ply cuff, collar or like work which includes the steps of drawing one of the facing plies of the work inwardly from the edges to be beaded and subjecting the work to pressure.

9. That method of beading the edges of a turned multi-ply cuff, collar or like work which includes the steps of drawing one of the facing plies of the work inwardly from the edges to be beaded and simultaneously subjecting the work to pressure.

10. That method of beading the edges of a turned multi-ply cuff, collar or like work which includes the steps of drawing one of the facing plies of the work inwardly from the said edges over the edges of a former member, and simultaneously subjecting the work to pressure.

11. That method of beading the edges of a turned multi-ply cuff, collar or like work which includes the steps of contracting one of the facing plies of the work, and simultaneously subjecting the work to pressure.

12. In a machine of the class described, means for beading the edges of a turned cuff, collar or like work, means for pressing the work, and means for delivering the work from the beading means to the pressing means.

13. In a machine of the class described, means for beading the edges of a turned cuff, collar or like work, means for repeatedly subjecting the piece of work to pressure, and means for delivering the work from the beading means to the pressing means.

14. In a machine of the class described, work turning means including coacting turning members, one of said members having spaced portions over which the work is to be fitted, and means for deflecting the forward edge of the work, the other member being arranged to engage the deflected forward portion of the work substantially at the forward fold seam thereof and to enter between the said portions whereby to effect the turning of the work.

15. In a machine of the class described, means for turning a cuff, collar or like work made up of a plurality of plies united by a line of stitching spaced inwardly from the edges of the plies, the said means including coacting turning members, one of said members having spaced portions over which the work is to be fitted with a single one of the plies located at the outer face of one of the spaced portions of the said member and the other plies located at the outer face of the other spaced portion of the said member, and means for deflecting the longitudinal edge portions of the plies, the other one of the said members being arranged to engage the work adjacent the said line of stitching and to enter with the work between the said portions of the first mentioned member whereby to effect the turning of the work.

16. In a machine of the class described, means for turning a cuff, collar or like work including a contractible and expansible turning member, means for contracting the member to permit of ready feeding of the work thereto, means for expanding the member to distend the work, the said member including spaced portions, a second contractible and expansible turning member arranged for co-action with the first mentioned member, means for contracting the second mentioned member, means for actuating the same to enter between the spaced portions of the first mentioned member whereby to effect turning of the work, and means for expanding the second mentioned turning member.

17. In work turning mechanism, a shaft, means for imparting intermittent rotary motion to the shaft, a turning member carried by the said shaft and including a section relatively fixed upon the shaft and a section movable longitudinally of the shaft in a plane with the first mentioned section, means tending to separate the said sections, means coacting with the second mentioned section to move the same toward the first mentioned section whereby to decrease the length of the said member and permit of the ready application of the work thereto, in one position of rotation of the said shaft, the separating means being arranged in another position of rotation of the shaft to coact with the second mentioned section to increase the length of the said member whereby to distend the work, the said sections of the member each including spaced portions, and a second turning member arranged to engage the work and enter between the spaced portions of the sections of the first mentioned member whereby to effect turning of the work.

18. In mechanism for turning cuffs, collars and like work, a shaft, means for intermittently rotating the said shaft, a plurality of turning members carried by the shaft and each including a section fixed with relation to the shaft and a companion section movable longitudinally of the shaft toward and away from the first mentioned sections, means tending to move the second mentioned section of each member away from the first mentioned section thereof, a cam held against rotation with the shaft and coacting with the second mentioned sections and arranged, in the rotation of the shaft, to successively move the second mentioned sections of the said turning members in the direction of the first mentioned sections whereby to successively decrease the lengths of the members to permit of the ready application of the work thereto, the said cam being arranged in further rotation of the shaft to successively release the second mentioned sections of the members and permit action of the means tending to move the second mentioned members away from the first mentioned members whereby to successively increase the length of the members and thereby distend the work, the sections of each member including correspondingly spaced portions, and another turning member arranged to successively coact with the first mentioned members to engage that portion of the work extending across the gap between the spaced portions of the first mentioned members and to enter between the said portions with the work whereby to effect turning of the work.

19. In a machine of the class described, a shaft, means for intermittently rotating the shaft, a plurality of work supporting and turning members mounted upon the said shaft and arranged to be successively brought to position for performance of the turning operation, each of the said members including spaced portions, means for pressing the work subsequent to the turning operation, a tumbling shaft, a work turning member carried by the said shaft, and means for imparting motion to the shaft whereby to present the turning member to the first mentioned turning members successively and to cause the said turning member to enter between the spaced portions of the first mentioned turning members as they are successively brought to position for performance of the turning operation whereby to effect turning of the work upon the first mentioned turning members, the said actuating means for the shaft being further arranged to retract the turning member carried thereby from between the spaced portions of the first mentioned turning members with the work thereon and to deliver the said work to the pressing means.

20. In a machine of the class described, means for beading the edges of a turned cuff, collar or like work including means for drawing a ply of said work inwardly from the edges to be beaded, and means for pressing the work to definitely establish the bead.

21. In a machine of the class described, a shaft, friction gearing tending to continuously rotate the shaft, means for holding the shaft against rotation, work holding and turning members carried by the shaft, a shaft mounted for reciprocatory and rotary motion, a work turning member carried by the last mentioned shaft, means actuated by the movement of the last mentioned shaft for rendering the holding means for the first mentioned shaft inactive at predetermined intervals in the operation of the second mentioned shaft to permit of intermittent rotation of the said first mentioned shaft whereby to successively bring the turning members into position for performance of the turning operation, means for pressing the work, and means for reciprocating the second mentioned shaft to cause the turning member carried thereby to coact with the turning member upon the first mentioned shaft, for rotating the second mentioned shaft to present the turning member and the work carried thereby toward the pressing means, and for reciprocating the second mentioned shaft to deliver the work to the said pressing means.

22. In a machine of the class described, a shaft, friction gearing tending to continuously rotate the shaft, latch means for holding the shaft against rotation, work holding and turning members carried by the shaft, a shaft mounted for reciprocatory and rotary motion, a work turning member carried by the last mentioned shaft, a cam carried by the last mentioned shaft and arranged at a predetermined time in the movement of the last mentioned shaft to reciprocate the latch means and render the same inactive whereby to permit of intermittent rotation of the said first mentioned shaft to successively bring the turning members carried thereby into position for performance of the turning operation, means for pressing the work, and means for reciprocating the second mentioned shaft to cause the turning member carried thereby to coact with the turning members upon the first mentioned shaft, for rotating the second mentioned shaft to present the turning member and the work carried thereby toward the pressing means, and for reciprocating the second mentioned shaft to deliver the work to the said pressing means.

23. In a machine of the class described, a shaft, work holding and turning members carried by the shaft, means for intermittently rotating the shaft to successively bring the work holding members to position for performance of the work turning operation, a shaft mounted for reciprocatory motion and for rotary motion, means for reciprocating the second mentioned shaft, a work turning member carried by the second mentioned shaft and arranged, in the reciprocation of the shaft in one direction to be presented to and coact with the first mentioned work turning members, successively, means for pressing the work, and means arranged during a period in the reciprocation of the second mentioned shaft in the other direction, to rotate the said shaft whereby to present the turning member carried thereby to said pressing means, continued reciprocation of the said second mentioned shaft in the last mentioned direction serving to so move the turning member carried thereby as to deliver the work thereon to the said pressing means.

24. In a machine of the class described, a work holding and turning member including sections relatively movable whereby one dimension of the member may be increased and decreased, means for moving the member into and out of position for the performance of the work turning operation, means for moving one of the sections of the members to decrease the said dimension of the member as the member is moved out of position for performance of the turning operation whereby to permit of the ready application thereto of the work to be turned, means for moving the said section of the member in a direction to increase the said dimension of the member as the member is moved to position for the performance of the work turning operation, and a work turning member arranged for coöperation with the first mentioned member when the latter is in position for performance of the turning operation, the first mentioned member including spaced portions between which the second mentioned member is caused to enter with the work whereby to effect the turning operation.

25. In a machine of the class described, a work holding and turning member including sections relatively movable whereby one dimension of the member may be increased and decreased, means for moving the member into and out of position for the performance of the work turning operation, means for moving one of the sections of the member to decrease the said dimension of the member as the member is moved out of position for the performance of the work turning operation whereby to permit of the ready application thereto of the work to be turned, means for moving the said section of the member in a direction to increase the said dimension of the member as the member is moved to position for performance of the work turning operation, a second work turning member arranged for coöperation with the first mentioned turning member and comprising relatively movable sections, movement of the sections toward one another serving to decrease a dimension of the said member and movement of the sections away from one and another serving to increase the said dimension of the said member, and means for so relatively moving the said sections, the first mentioned member including spaced portions between which the second mentioned member is caused to enter with the work whereby to effect the turning operation.

26. In a machine of the class described, a work turning member movable from work receiving position to position for the performance of the turning operation and including spaced portions over which the work to be turned is to be fitted, means for longitudinally contracting the said member when in receiving position, means for longitudinally expanding the member when in position for performance of the work turning operation and after the work has been fitted thereto whereby to distend the said work, a second work turning member for coaction with the first mentioned member, means for longitudinally contracting the second mentioned member, means for actuating the second mentioned member whereby to cause the same to enter with the work between the spaced portions of the first mentioned member to effect the turning of the work, means for withdrawing the second mentioned turning member, and means for longitudinally expanding the second mentioned member to distend and hold the work prior to complete withdrawal of the said second mentioned member.

27. In a machine of the class described, a work turning member movable from work receiving position to position for the performance of the turning operation and including spaced portions over which the work to be turned is to be fitted, means for longitudinally contracting the said member when in receiving position, means for longitudinally expanding the member when in position for the performance of the work turning operation and after the work has beet fitted thereto whereby to distend the said work, a shaft, a work turning member carried thereby and including sections one of which is movable with relation to the other whereby the said member may be longitudinally expanded and contracted, means for actuating the shaft to move the second mentioned work turning member to position for coaction with the first mentioned member when the latter is in position for performance of the turning operation and to cause the second mentioned member to enter between the spaced portions of the first mentioned member with the work whereby to effect turning of the work, means for moving the said movable section of the second mentioned turning member toward the fixed section thereof whereby to longitudinally contract the member prior to entrance between the spaced portions of the first mentioned member, means for holding the said movable section in such position, means carried by the first mentioned turning member for coaction with the movable sections of the second mentioned member to move the same to release the holding means, the actuating means for the shaft being also operative to withdraw the second mentioned turning member from the first mentioned member after the turning operation, and means for moving the movable sections of the second mentioned member subsequent to release of the holding means whereby to longitudinally expand the second mentioned member within the work prior to withdrawal of the second mentioned member from the first mentioned member.

28. In a machine of the class described, a work turning member movable from work receiving position to position for the performance of the turning operation and including spaced portions over which the work to be turned is to be fitted, means for longitudinally contracting the said member when in receiving position, means for longitudinally expanding the member when in position for the performance of the work turning operation and after the work has been fitted thereto whereby to distend the said work, a shaft, a work turning member carried thereby and including sections one of which is movable with relation to the other whereby the said member may be longitudinally expanded and contracted, means for actuating the shaft to move the second mentioned work turning member to position for coaction with the first mentioned member when the latter is in position for performance of the turning operation and to cause the second mentioned member to enter between the spaced portions of the first mentioned member with the work whereby to effect turning of the work, means for moving the said movable section of the second mentioned turning member toward the fixed section thereof whereby to longitudinally contract the member prior to entrance between the spaced portions of the first mentioned member, means for holding the said movable section in such position, means carried by the first mentioned turning member for coaction with the movable section of the second mentioned member to move the same to release the holding means, the actuating means for the shaft being also operative to withdraw the second mentioned turning member from the first mentioned member after the turning operation, means for moving the movable section of the second mentioned member subsequent to release of the holding means whereby to longitudinally expand the second mentioned member within the work prior to withdrawal of the second mentioned member from the first mentioned member, and means for rotating the second mentioned shaft whereby to carry the work to position for delivery, the holding means for the movable section of the second mentioned turning member comprising a tapered key and spaced abutments upon the shaft and at the outer end of the said movable section of the second mentioned turning member between which the key is received, the key being arranged, when the shaft is rotated to position the second mentioned turning member for cooperation with the first mentioned turning member, and when the said movable section is further moved inwardly, to drop by gravity with its narrower portion located between the abutments whereby to permit functioning of the means provided for outwardly moving the said movable section, and the said key being further arranged, when the shaft has been rotated to move the second mentioned turning member to delivery position, and when the said movable section has been again moved inwardly to longitudinally contract the second mentioned member, to drop by gravity with its wider portion lying between the said abutments whereby to hold the said movable section against movement in a direction to longitudinally expand the said turning member.

29. In a machine of the class described, a work turning member movable from work receiving position to position for the performance of the turning operation and including spaced portions over which the work to be turned is to be fitted, means for longitudinally contracting the said member when in receiving position, means for longitudinally expanding the member when in position for the performance of the work turning operation and after the work has been fitted thereto whereby to distend the said work; a shaft, a work turning member carried thereby and including sections one of which is movable with relation to the other whereby the said member may be longitudinally expanded and contracted, means for actuating the shaft to move the second mentioned work turning member to position for coaction with the first mentioned member when the latter is in position for the performance of the turning operation and to cause the second mentioned member to enter between the spaced portions of the first mentioned member with the work whereby to effect turning of the work, means for moving the said movable section of the second mentioned turning member toward the fixed section thereof whereby to longitudinally contract the member prior to entrance between the spaced portions of the first mentioned member, means for holding the said movable section in such position, means carried by the first mentioned turning member for coaction with the movable section of the second mentioned member to move the same to release the holding means, the actuating means for the shaft being also operative to withdraw the second mentioned turning member from the first mentioned member after the turning operation, means for moving the movable section of the second mentioned member subsequent to release of the holding means whereby to longitudinally expand the second mentioned member within the work prior to withdrawal of the second mentioned member from the first mentioned member, and means for beading and pressing the work, the said means including pressing elements relatively movable inwardly and laterally to inwardly draw a ply of the work, the actuating means for the second mentioned shaft being arranged to move the shaft to cause the turning member carried thereby to present the work to the said beading and pressing means and the said relatively movable pressing elements constituting means for moving the movable section of the second mentioned turning member inwardly to longitudinally contract the said member.

30. In a machine of the class described, work turning means including coacting turning members, one of said members having spaced portions over which the work is to be fitted and the other member being arranged to engage the work substantially at the forward fold seam thereof and to enter between said portions whereby to effect turning of the work, and means for gripping the lateral edges of the work and feeding the work onto the second mentioned turning member as the second mentioned turning member enters between the spaced portions of the first mentioned member carrying with it the said work.

31. In a machine of the class described, work turning means including coacting turning members, one of said members having spaced portions over which the work is to be fitted and the other member being arranged to engage the work substantially at the forward fold seam thereof and to enter between said portions whereby to effect the turning of the work, spaced sets of gripping rolls arranged to grip the lateral edges of the work initially at the ends of the forward fold seam of the work, and means for rotating the said gripping rolls as the second mentioned member enters between the spaced portions of the first mentioned member whereby to feed and guide the said lateral edges of the work as the work is being turned onto the second mentioned member.

32. In a machine of the class described, work turning means including coacting turning members, one of said members having spaced portions over which the work is to be fitted and the other member being arranged to engage the work substantially at the forward fold seam thereof and to enter between the said portions whereby to effect the turning of the work, a reciprocatory support upon which the second mentioned turning member is mounted, spaced sets of gripping rolls arranged to grip the lateral edges of the work initially at the ends of the forward fold seam thereof, and means for rotating said gripping rolls whereby to guide and feed the said lateral edges of the work as the first mentioned member is moved by the reciprocation of the said support, to enter between the spaced portions of the first mentioned member, the said rotating means including a pinion operatively geared with the rolls, and a rack meshing with the pinion and movable through the reciprocation of the said supporting means for the second mentioned turning member.

33. In a machine of the class described, work turning means including coacting turning members, one of said members having spaced portions over which the work is to be fitted and the other member being arranged to engage the work substantially at the forward fold seam thereof and to enter between said portions whereby to effect the turning of the work, spaced sets of gripping rolls arranged to grip the lateral edges of the work initially at the ends of the forward fold seam of the work, means for rotating the said gripping rolls as the second mentioned member enters between the spaced portions of the first mentioned member whereby to feed and guide the said lateral edges of the work as the work is being turned onto the second mentioned member, and adjustable tensioning means for the rolls of each set.

34. In a machine of the class described, work turning means including coacting turning members, one of said members having spaced portions over which the work is to be fitted and the other member being arranged to engage the work substantially at the forward fold seam thereof and to enter between said portions whereby to effect the turning of the work, spaced sets of gripping rolls arranged to grip the lateral edges of the work initially at the ends of the forward fold seam of the work, means for rotating the said gripping rolls as the second mentioned member enters between the spaced portions of the first mentioned member whereby to feed and guide the said lateral edges of the work as the work is being turned onto the second mentioned member, and means whereby one set of gripping rolls may be adjusted with relation to the other set of rolls.

35. In a machine of the class described, work turning means including coacting turning members, one of said members having spaced portions over which the work is to be fitted and the other member being arranged to engage the work substantially at the forward fold seam thereof and to enter between said portions whereby to effect the turning of the work, spaced sets of gripping rolls arranged to grip the lateral edges of the work initially at the ends of the forward fold seam of the work, means for rotating the said gripping rolls as the second mentioned member enters between the spaced portions of the first mentioned member whereby to feed and guide the said lateral edges of the work as the work is being turned onto the second mentioned member, means for supporting the said rolls including a shaft, rock arms mounted thereon, and means for rocking the said shaft to correspondingly rock the arms and move the rolls in the direction of the work in position for gripping engagement with the lateral edges thereof.

36. In a machine of the class described, work turning means including coacting turning members, one of said members having spaced portions over which the work is to be fitted and the other member being arranged to engage the work substantially at the forward fold seam thereof and to enter between the said portions whereby to effect the turning of the work, spaced sets of gripping rolls for gripping and feeding the lateral edges of the work as the second mentioned turning member enters between the spaced portions of the first mentioned turning member, and means for rotating the rolls during such movement of the second mentioned member including a pinion operatively geared with the rolls, a reciprocatory rack bar meshing with the pinion, and means for reciprocating the rack bar.

37. In a machine of the class described, work turning means including coacting turning members, one of said members having spaced portions over which the work is to be fitted and the other member being arranged to engage the work substantially at the forward fold seam thereof and to enter between said portions whereby to effect the turning of the work, a reciprocatory support carrying the second mentioned turning member, means for moving the support to cause the said second mentioned member to enter between the spaced portions of the first mentioned turning member, spaced sets of gripping rolls for gripping and feeding the lateral edges of the work as the second mentioned member enters between the spaced portions of the first mentioned member, a pinion operatively geared with the said rolls, a reciprocatory rack bar meshing with the pinion, means carried by the support for the second mentioned member for moving the rack bar in one direction to effect turning of the said rolls, and means for turning the rack bar.

38. In a machine of the class described, work turning means including coacting turning members, one of said members having spaced portions over which the work is to be fitted and the other member being arranged to engage the work substantially at the forward fold seam thereof and to enter between said portions whereby to effect the turning of the work, a reciprocatory support carrying the second mentioned turning member, means for moving the support to cause the said second mentioned member to enter between the spaced portions of the first mentioned turning member, spaced sets of gripping rolls for gripping and feeding the lateral edges of the work as the second mentioned member enters between the spaced portions of the first mentioned member, a pinion operatively geared with the said rolls, a reciprocatory rack bar meshing with the pinion, means carried by the support for the second mentioned turning member for moving the rack bar in one direction to effect turning of the said rolls, means for turning the rack bar, means for supporting the said rolls including a rock shaft, arms carried thereby for the support of the rolls, means tending to move the shaft in a direction to rock the arms to move the rolls into position for gripping engagement with the lateral edges of the work, and means controlled by the movement of the rack bar for moving and holding the said arms to and in position to place the rolls in inactive relation to the first mentioned turning member.

39. In a machine of the class described, work turning means including coacting turning members, one of said members having spaced portions over which the work is to be fitted and the other member being arranged to engage the work substantially at the forward fold seam thereof and to enter between said portions whereby to effect the turning of the work, a reciprocatory support carrying the second mentioned turning member, means for moving the support to cause the said second mentioned member to enter between the spaced portions of the first mentioned turning member, spaced sets of gripping rolls for gripping and feeding the lateral edges of the work as the second mentioned member enters between the spaced portions of the first mentioned member, a pinion operatively geared with the said rolls, a reciprocatory rack bar meshing with the pinion, means carried by the support for the second mentioned turning member for moving the rack bar in one direction to effect turning of the said rolls, means for turning the rack bar, means for supporting the said rolls including a rock shaft, arms carried thereby for the support of the rolls, means tending to move the shaft in a direction to rock the arms to move the rolls into position for gripping engagement with the lateral edges of the work, and an abutment carried by the rack bar and arranged in the return movement of the rack bar to coact with the said pinion whereby to move the supporting arms and position the gripping rolls out of operative relation to the first mentioned turning member.

40. In a machine of the class described, work turning means including coacting turning members, one of said members having spaced portions over which the work is to be fitted and the other member being arranged to engage the work substantially at the forward fold seam thereof and to enter between said portions whereby to effect the turning of the work, spaced sets of gripping rolls arranged to grip the lateral edges of the work initially at the ends of the forward fold seam of the work, means for rotating the said gripping rolls as the second mentioned member enters between the spaced portions of the first mentioned member whereby to feed and guide the said lateral edges of the work as the work is being turned onto the second mentioned member, means for supporting the said rolls including a shaft, rock arms mounted thereon, a rotatable cam, and a leaf spring having operative connection with the shaft and bearing at its free end against the said cam, the said spring tending to so move the shaft as to rock the arms to bring the gripping rolls into operative relation to the work.

41. In a machine of the class described, means for beading and pressing a turned cuff, collar or like work including a work supporting member, coacting press members, one of said press members including sections relatively movable inwardly laterally, means for moving the work supporting member into position between the said press members, means for moving the said sectional press member and simultaneously relatively moving the sections thereof whereby to draw a ply of the work over the edges of the work supporting member whereby to form the bead and simultaneously press the work.

42. In a machine of the class described, means for beading and pressing a cuff, collar or like work including coacting press members one of said members being movable with relation to the other and including relatively movable sections, means tending to separate the sections, a work supporting member movable to carry the work into position between the said members, and means for simultaneously moving the sectional pressing member into coöperative pressing relation to the other press member and moving the sections thereof in a direction to draw a ply of the work over the edges of the work supporting member.

43. In a machine of the class described, means for beading and pressing a cuff, collar or like work including coacting press members, one of said members including relatively movable sections, means for simultaneously moving the sectional member into pressing relation to the other press member and relatively moving the sections thereof inwardly toward each other, a work holding plate, and means for moving the plate together with the work carried thereby into position between the said press members, and after actuation of the sectional press member, to withdraw the said plate.

44. In a machine of the class described, means for beading and pressing a cuff, collar or like work including coacting press members, one of said press members including relatively movable sections, means for simultaneously moving the sectional member into pressing relation to the other press member and relatively moving the sections thereof inwardly toward each other, a work holding plate, and means for moving the plate together with the work carried thereby into position between the said press members, and after actuation of the sectional press member, to withdraw the said plate, the actuating means for the said sectional press member being arranged, upon withdrawal of the work supporting plate, to further actuate the sectional press member to cause the same to exert pressure in increased degree upon the work.

45. In a machine of the class described, means for beading and pressing a cuff, collar or like work including coacting press members, one of said members including relatively movable sections, means tending to separate the said sections, the pressing faces of the said sections being friction surfaced, means for moving the sectional press member toward the other press member and simultaneously moving the said sections toward each other, and a work supporting plate movable with the work between the said press members prior to movement of the sectional press member, the movement of the sections of the sectional press member toward each other serving to draw a ply of the work over the edges of the work supporting plate whereby to form the bead.

46. In a machine of the class described, means for beading and pressing a cuff, collar or like work including coacting press members, one of said members including relatively movable sections, means tending to separate the said sections, the pressing faces of the said sections being friction surfaced, means for moving the sectional press member toward the other press member and simultaneously moving the said sections toward each other, a work supporting plate movable with the work between the said press members prior to movement of the sectional press member, the movement of the sections of the sectional press member toward each other serving to draw a ply of the work over the edges of the work supporting plate whereby to form the bead, the actuating means for the work supporting plate being arranged to withdraw the plate subsequent to formation of the bead, and actuating means for the sectional press member being arranged subsequent to withdrawal of the plate, to further move the sectional press member toward the other press member whereby to subject the work to further pressure.

47. In a machine of the class described, means for beading and pressing a cuff, collar or like work including coacting press members, one of said members including sections movable toward each other whereby to longitudinally contract the pressing face of the said member and thereby inwardly draw a ply of the work to form the bead, a follower coacting with the said sections of the movable press member, and means coacting with the follower for moving the said member in the direction of the other member, and coacting means upon the said follower and the said sections of the movable press member for so relatively moving the said sections.

48. In a machine of the class described, means for beading and pressing a cuff, collar or like work including coacting press members, one of said members including relatively movable sections, means for feeding the work between the said press members, means for moving the sectional press member whereby to relatively move the said sections to form the bead and to cause pressing coaction of the sectional member with the other press member whereby to definitely establish the bead, means for finally pressing the beaded work, means for feeding the work to the final pressing means, and means for bodily moving the first mentioned press member in the direction of the said feeding means whereby to deliver the work thereto.

49. In a machine of the class described, means for beading and pressing a cuff, collar or like work including coacting press members, means arranged upon coaction of the members to form the bead and initially press the members whereby to definitely establish the bead, means for finally pressing the work, means for feeding the work to the final pressing means, means supporting the first mentioned press members for movement bodily in the direction of the feeding means, and means for so moving the said first mentioned press members whereby to deliver the work therefrom to the said feeding means.

50. In a machine of the class described, means for beading and pressing a cuff, collar or like work including coacting press members, a work supporting plate, means for moving the plate with the work to position between the said press members, one of said press members including relatively movable sections, a follower coacting with the said sections, coacting means upon the sections and follower for relatively moving the sections, in the movement of the follower, to draw the work over the edges of the work supporting member whereby to form the bead, the actuating means for the said work supporting member operating also to withdraw the member from the work subsequent to the beading and pressing operation, the means for actuating the follower including a rocker arranged at one end for coaction with the follower, means yieldably supporting the rocker for rocking movement, and means coacting with the follower at the other side of its support for initially moving the follower to cause such relative movement of the sections of the sectional press member and initial pressing coaction of the said sectional press member with the other press member and for further moving the follower, subsequent to withdrawal of the work supporting member, whereby to cause the sectional press member to exert further pressure upon the work and definitely establish the bead.

51. In a machine of the class described, means for beading and pressing a cuff, collar or like work including coacting press members, one of said members being relatively fixed and the other member including relatively movable sections, a work supporting member, means for moving the member into and out of position between the said press members, a follower coacting with the sections of the said movable press member, coacting means upon the follower and said sections for relatively moving the sections upon movement of the follower in one direction, a rocker coacting with the follower at one side of the axis of rotation of the rocker, and a multiple arc cam coacting with the rocker at the other side of the axis thereof and arranged in its rotation to move the follower to cause relative movement of the said sections while the work supporting member is in position with the work between the said press members and thereby draw a ply of the work over the edges of the work supporting member to form the bead and initially press the work, further rotation of the said cam actuating the follower to move the sectional press member to further press the work and definitely establish the bead, and still further rotation of the cam serving to permit return movement of the follower whereby to provide for movement of the sectional press member away from the relatively fixed press member.

52. In a machine of the class described, means for beading and pressing a cuff, collar or like work including coacting press members, one of said members including relatively movable sections, a work supporting member, means for actuating the said member to feed the same and the work between the said press members and for withdrawing the said member after the beading and pressing operation, the said work supporting member including sections relatively movable, means tending to separate the said sections whereby to longitudinally expand the said work supporting member, and means for moving the sectional press member with relation to the other press member, and for moving the said sections relatively inwardly whereby to draw a ply of the work inwardly over the edges of the sections of the work holding member to form the bead while the work and the said work holding member are between the press members and thereby simultaneously relatively move the sections of the work supporting member toward each other to longitudinally contract the said work supporting member to permit of the same clearing the work readily upon withdrawal of the said work supporting member from between the press members.

53. In a machine of the class described, means for beading and pressing a cuff, collar or like work including coacting press members, one of said members including relatively movable sections, a work supporting plate including sections relatively movable whereby to longitudinally contract and longitudinally expand the said plate, means tending to relatively move the sections of the plate to expand the same, means for actuating the said plate to move the same between the press members together with the work carried thereby, said means being also operable to withdraw the plate subsequent to the beading and pressing operation, and means for actuating the sectional press member whereby to cause pressing coaction of the same with the other press member and also relative movement of the said sections thereof whereby to draw a ply of the work over the edges of the said sections of the plate to form the bead and simultaneously move the sections toward each other to longitudinally contract the plate whereby to permit of ready withdrawal of the plate from between the said press members.

54. In a machine of the class described, means for beading and pressing a cuff, collar or like work including coacting press members, one of said members including relatively movable sections, a work supporting plate including sections relatively movable whereby to longitudinally contract and longitudinally expand the said plate, means tending to relatively move the sections of the plate to expand the same, means for actuating the said plate to move the same between the press members together with the work carried thereby, said means being also operable to withdraw the plate subsequent to the beading and pressing operation, and means for actuating the sectional press member whereby to cause pressing coaction of the same with the other press member and also relative movement of the said sections thereof whereby to draw a ply of the work over the edges of the said sections of the plate to form the bead and simultaneously move the sections toward each other to longitudinally contract the plate whereby to permit of ready withdrawal of the plate from between the said press members, the actuating means for the sectional press member being further operable to exert further pressure upon the work subsequent to withdrawal of the said work supporting plate.

55. In a machine of the class described, means for beading and pressing a cuff, collar or like work including coacting press members, one of said members including relatively movable sections, a work supporting plate including sections relatively movable whereby to longitudinally contract and longitudinally expand the said plate, means tending to relatively move the sections of the plate to expand the same, means for actuating the said plate to move the same between the press members together with the work carried thereby, said means being also operable to withdraw the plate subsequent to the beading and pressing operation, means for actuating the sectional press member whereby to cause pressing coaction of the same with the other press member and also relative movement of the said sections thereof whereby to draw a ply of the work over the edges of the said sections of the plate to form the bead and simultaneously move the sections toward each other to longitudinally contract the plate whereby to permit of ready withdrawal of the plate from between the said press members, and means for holding the said sections of the plate in such position during the time of withdrawal of the plate.

56. In a machine of the class described, means for finally pressing a turned and beaded cuff, collar or like work including coacting press members, means for intermittently causing coaction of the press members, an apron arranged for travel between the said members and to carry the work between the said members, a rotary element over which the apron passes, and a friction segment arranged for intermittent coaction with the said rotary element and apron whereby to advance the apron during the periods the press members are relatively inactive.

57. In a machine of the class described, means for finally pressing a turned and beaded cuff, collar or like work including coacting press members, means for intermittently causing coaction of the press members, an apron arranged for travel between the said members and to carry the work between the said members, a rotary element over which the apron passes, a friction segment arranged for intermittent coaction with the said rotary element and apron whereby to advance the apron during the periods the press members are relatively inactive, and means whereby the length of the friction face of the said segment may be varied.

58. In a machine of the class described, means for finally pressing a turned and beaded cuff, collar or like work including coacting press members, means for intermittently causing coaction of the press members, an apron arranged for travel between the said members and to carry the work between the said members, a rotary element over which the apron passes, a friction segment arranged for intermittent coaction with the said rotary element and apron whereby to advance the apron during the periods the press members are relatively inactive, the said segment including sections, and means whereby one of said sections may be adjusted with relation to the other, the said sections each having an arcuate friction face and adjustment of the said sections serving to vary the length of the friction face of the segment as a whole.

59. In a machine of the class described, means for finally pressing a turned and beaded cuff, collar or like work including coacting press members, means for intermittently causing coaction of the press members, an apron arranged for travel between the said members and to carry the work between the said members, a rotary element over which the apron passes, a friction segment arranged for intermittent coaction with the said rotary element and apron whereby to advance the apron during the periods the press members are relatively inactive, a shaft supporting the said segment, the said segment comprising a section fixed for rotation with the shaft and a section slidably and angularly adjustable upon the shaft, means for holding the sections in positions of relative adjustment, and means for adjusting the second-mentioned section.

60. That method of beading a multi-ply cuff, collar or like blank which consists in turning the blank and simultaneously beading an edge thereof, and subsequently beading other edges of the blank.

In testimony whereof I affix my signature.

GEORGE A. SAGER. [L. S.]